United States Patent
Jamadagni et al.

(10) Patent No.: US 12,445,170 B2
(45) Date of Patent: Oct. 14, 2025

(54) SYSTEM AND METHOD FOR SHARING INTELLIGENT REFLECTING SURFACES (IRS) IN NETWORKS

(71) Applicant: JIO PLATFORMS LIMITED, Ahmedabad (IN)

(72) Inventors: Satish Nanjunda Swamy Jamadagni, Bangalore (IN); Mahesh Nayaka Mysore Annaiah, Bangalore (IN); Mathew Oommen, Mumbai (IN); Pradeep Krishnamurthy Hirisave, Bangalore South (IN); Vinay Shrivastava, Bangalore (IN); Surabhi Karandikar, Nagpur (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/247,459

(22) PCT Filed: Mar. 24, 2023

(86) PCT No.: PCT/IB2023/052934
§ 371 (c)(1),
(2) Date: Mar. 31, 2023

(87) PCT Pub. No.: WO2023/187580
PCT Pub. Date: Oct. 5, 2023

(65) Prior Publication Data
US 2024/0380435 A1   Nov. 14, 2024

(30) Foreign Application Priority Data

Mar. 31, 2022   (IN) .............................. 202221019788

(51) Int. Cl.
*H04B 7/04* (2017.01)
*H04B 7/06* (2006.01)
(Continued)

(52) U.S. Cl.
CPC ....... *H04B 7/04013* (2023.05); *H04B 7/0621* (2013.01); *H04B 17/328* (2023.05); *H04W 24/10* (2013.01)

(58) Field of Classification Search
CPC .................. H04B 7/04013; H04B 7/0621; H04B 17/328; H04B 7/15528; H04B 7/0626;
(Continued)

(56) References Cited

U.S. PATENT DOCUMENTS

2023/0176174 A1* 6/2023 Penna ...................... H01Q 3/46
   342/451
2023/0199734 A1   6/2023 Sun
2023/0422335 A1* 12/2023 Bao ....................... H04W 76/19
(Continued)

FOREIGN PATENT DOCUMENTS

WO   2021221603 A1   11/2021
WO   2022037372 A1   2/2022

OTHER PUBLICATIONS

International Search Report issued by the International Searching Authority issued in related Foreign Application No. PCT/IB2023/052934, mailed Aug. 4, 2023 (2 pgs.).
(Continued)

*Primary Examiner* — Habte Mered
(74) *Attorney, Agent, or Firm* — FINNEGAN, HENDERSON FARABOW, GARRETT, & DUNNER LLP

(57) ABSTRACT

Disclosed embodiment of network device includes one or more processors coupled to a memory storing a set of instructions which when executed by the one or more processors cause the network device to: receive, from an IRS manager, a scheduling data request. The one or more processors further causes the network device to transmit, to the IRS manager, responsive to the received scheduling data request, a scheduling data response and receive, from the
(Continued)

IRS manager, an IRS resource command, wherein the IRS manager transmits the IRS resource command responsive to the scheduling data response. Further, the one or more processors causes the network device to transmit to an IRS controller associated with the IRS, the received IRS resource command, wherein IRS controller is configured to allocate the IRS resources to each of the plurality of UEs based on the IRS resource command.

20 Claims, 23 Drawing Sheets

(51) Int. Cl.
*H04B 17/318* (2015.01)
*H04W 24/10* (2009.01)

(58) Field of Classification Search
CPC ... H04B 7/0632; H04B 17/382; H04W 24/10; H04W 72/12; H04W 72/20; H04W 72/0446; H04W 72/54
See application file for complete search history.

(56) References Cited

U.S. PATENT DOCUMENTS

2025/0167835 A1\* 5/2025 Obeid ................. H04L 25/0256
2025/0175219 A1\* 5/2025 Elshafie ................ H04L 5/0091

OTHER PUBLICATIONS

Wu, Qingqing, et al.; "Intelligent Reflecting Surface-Aided Wireless Communications: A Tutorial," IEEE Transactions on Communications, vol. 69, No. 5, May 2021 (39 pgs.).

\* cited by examiner

SYSTEM AND METHOD FOR SHARING INTELLIGENT REFLECTING SURFACES (IRS) IN NETWORKS

RESERVATION OF RIGHTS

A portion of the disclosure of this patent document contains material, which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The present invention relates generally to IRS network architectures, and more particularly to sharing of IRS resources in communication networks.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Existing communication technologies (e.g., 5G) and future technologies (e.g., 6G) face two main practical limitations. Firstly, there exists a lack of control over the wireless channel, and secondly, there is a high-power consumption of the wireless interface with respect to the networks. To address the need for green and sustainable future cellular networks, the concept of reconfiguring wireless propagation environments using Intelligent Reflecting Surfaces (IRS) or RIS (Reconfigurable Intelligent Surfaces) has emerged in the last few years. A typical IRS architecture comprises of many low-cost passive antennas that can smartly reflect the impinging electromagnetic waves for performance enhancement.

The 5G wireless technology that is being developed in 3GPP is meant to deliver higher multi-Gbps peak data speeds, ultra-low latency, more reliability, massive network capacity, increased availability, and a more uniform user experience to more users. Higher performance and improved efficiency empower new user experiences and connects newer industries. Some of the above-mentioned objectives have been met but there are still quite a few issues that needs to be resolved in the existing 5G networks. For example, existing 5G networks may not optimally accommodate multiple industry verticals, may not provide architectures to support private networks and support flexible network deployments.

Reconfigurable Intelligent Surfaces (RIS) are fast emerging as a key wireless technology trend for 5G networks and also beyond 5G networks. RIS correspond to smart radio surfaces of many small antennas or reconfigurable metamaterial elements ("unit cells"), which enable the controlling of propagation environment through tuneable scatterings of electromagnetic waves. These intelligent surfaces have reflection, refraction, and absorption properties, which are reconfigurable and adaptable to the radio channel environment.

Further, the existing 5G networks still do not use many of the available or emerging technologies in an optimal manner to solve many of the above-mentioned problems. Examples of such available technologies include artificial intelligence, terahertz communications, optical wireless technology, free space optic network, blockchain, three-dimensional networking, quantum communications, unmanned aerial vehicle, cell-free communications, integration of wireless information and energy transfer, integration of sensing and communication, integration of access-backhaul networks, dynamic network slicing, holographic beamforming, and big data analytics.

Further, with reference to 6G networks, existing systems and methods do not provide for any 6G network interface architecture and any protocol between the 6G network and the IRS that satisfactorily addresses the concerns as highlighted above with reference to current 5G networks. Further, current methods and systems do not provide for a feature of sharing IRS resources of an IRS between multiple base stations in 6G/5G networks.

There is, therefore, a requirement in the art for a system and a method for providing an IRS architecture for 5G networks and beyond networks (6G networks) that can overcome the aforementioned problems in the art and can utilize the convergence of at least one or more of the above-mentioned available technologies.

OBJECTS OF THE PRESENT DISCLOSURE

Some of the objects of the present disclosure, which at least one embodiment herein satisfies are as listed herein below.

It is an object of the present disclosure to facilitate an effective, concurrent, and improved communication between a base station (BS) in 5G/6G networks and one or more UEs.

It is an object of the present disclosure to eliminate the need for additional and expensive deployment of BS for better network coverage in 6G and further networks.

It is an object of the present disclosure to facilitate an economical and next generation-based system and a method that can enable a communication interface or network interface between BS and IRS in 6G and further networks.

It is an object of the present disclosure to facilitate a system and a method that can enable control of IRS by the BS using a communication or network interface in 6G and further networks.

It is an object of the present disclosure to provide UE support for the implementation of an IRS architecture in an efficient manner.

It is an object of the present invention to enhance the user experience.

It is an object of the present invention to share IRS resources of an IRS amongst a plurality of base stations.

SUMMARY OF THE INVENTION

Some of the objects of the present disclosure, which at least one embodiment herein satisfies are as listed herein below.

Embodiments of a network device for sharing Intelligent Reflecting Surface (IRS) resources of an Intelligent Reflecting Surface (IRS) in a communication network are disclosed. In an embodiment, the network device includes one or more processors coupled to a memory storing a set of instructions which when executed by the one or more processors cause the network device to: receive, from an IRS manager, a scheduling data request, wherein the IRS manager transmits the scheduling data request upon determination of poor signal reception by a plurality of User Equipment (UEs) based at least in part on a measurement report received from the network device corresponding to each of the plurality of UEs. The one or more processors further causes the network device to transmit, to the IRS manager, responsive to the received scheduling data request, a scheduling data response and receive, from the IRS manager, an IRS resource command, wherein the IRS manager transmits the IRS resource command responsive to the scheduling data response. Further, the one or more processors causes the network device to transmit to an IRS controller associated with the IRS, the received IRS resource command, wherein IRS controller is configured to allocate the IRS resources to each of the plurality of UEs based on the IRS resource command.

In an embodiment, the IRS manager transmits the scheduling data request upon determination of presence of the plurality of UEs in the coverage of the IRS. In an embodiment, the measurement report comprises a Channel Quality Indicator (CQI) and Channel State Information (CSI) parameter of a serving cell, and Reference Signal Received Power (RSRP) information, and a Reference Signal Received Quality (RSRQ) parameter of a pilot signal as received from the IRS by each of the plurality of UEs. In an embodiment, the processor is further configured to communicate with the IRS manager via a Common Communications Interface Module (CCIM) Interface. In an embodiment, the processor is configured to communicate with the IRS controller via a DUI Interface. In an embodiment, the scheduling data request comprises a list of cell IDs of serving cells, list of the plurality of UEs, and no. of transmission time intervals (TTIs). In an embodiment, the scheduling data response comprises an amount of data to be scheduled, balance Packet Delay Budget (PDB) for data to be scheduled, an allocated Modulation and Coding Scheme (MCS), and a Received Channel Status Information (CSI). In an embodiment, the IRS resource command comprises a list of cell IDs, a list of UEs from the plurality of UEs, a list of IRS resources allocated for each cell and a corresponding validity time for allocation of IRS resources. In an embodiment, the IRS Manager is configured to, based on the received scheduling data response, derive a determined share of IRS resources for each cell being served. In an embodiment, the processor configures a MAC scheduler to start using allocated IRS resources for the plurality of UEs that are under coverage of the IRS.

Embodiments of a method for sharing Intelligent Reflecting Surface (IRS) resources of an Intelligent Reflecting Surface (IRS) in a communication network are disclosed. In an embodiment, the method includes receiving, by a network device, from an IRS manager, a scheduling data request, wherein the IRS manager transmits the scheduling data request upon determination of poor signal reception by a plurality of User Equipment (UEs) based at least in part on a measurement report received from the network device corresponding to each of the plurality of UEs. The method further includes transmitting, by the network device, to the IRS manager, responsive to the received scheduling data request, a scheduling data response and receiving, by the network device, from the IRS manager, an IRS resource command, wherein the IRS manager transmits the IRS resource command responsive to the scheduling data response. The method further includes transmitting, by the network device, to an IRS controller associated with the IRS, the received IRS resource command, wherein IRS controller is configured to allocate the IRS resources to each of the plurality of UEs based on the IRS resource command.

In an embodiment, the measurement report comprises a Channel Quality Indicator (CQI) and Channel State Information (CSI) parameter of a serving cell, and Reference Signal Received Power (RSRP) information, and a Reference Signal Received Quality (RSRQ) parameter of a pilot signal as received from the IRS by each of the plurality of UEs. In an embodiment, the network device is configured to communicate with the IRS manager via a Common Communications Interface Module (CCIM) Interface. In an embodiment, the network device is configured to communicate with the IRS controller via a DUI Interface. In an embodiment, the scheduling data request comprises a list of cell IDs of serving cells, list of the plurality of UEs, and no. of transmission time intervals (TTIs). In an embodiment, the scheduling data response comprises an amount of data to be scheduled, balance Packet Delay Budget (PDB) for data to be scheduled, an allocated Modulation and Coding Scheme (MCS), and a Received Channel Status Information (CSI). In an embodiment, the IRS resource command comprises a list of cell IDs, a list of UEs from the plurality of UEs, a list of IRS resources allocated for each cell and a corresponding validity time for allocation of IRS resources. In an embodiment, the method further includes configuring, by the network device, a MAC scheduler to start using allocated IRS resources for the plurality of UEs that are under coverage of the IRS. In an embodiment, the IRS Manager is configured to, based on the received scheduling data response, derive a determined share of IRS resources for each cell being served.

Embodiments of a non-transitory computer readable medium (CRM) for sharing of IRS resources of an IRS are disclosed. The non-transitory CRM includes a set of instructions that when executed by a processor comprised in a network device, causes the processor to receive, from an IRS manager, a scheduling data request, wherein the IRS manager transmits the scheduling data request upon determination of poor signal reception by a plurality of User Equipment (UEs) based at least in part on a measurement report received from the network device corresponding to each of the plurality of UEs. The set of instructions when executed further causes the processor to transmit, to the IRS manager, responsive to the received scheduling data request, a scheduling data response and receive, from the IRS manager, an IRS resource command, wherein the IRS manager transmits the IRS resource command responsive to the scheduling data response. The set of instructions when executed further causes the processor to transmit, to an IRS controller associated with the IRS, the received IRS resource command, wherein IRS controller is configured to allocate the IRS resources to each of the plurality of UEs based on the IRS resource command.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

Figure 1:
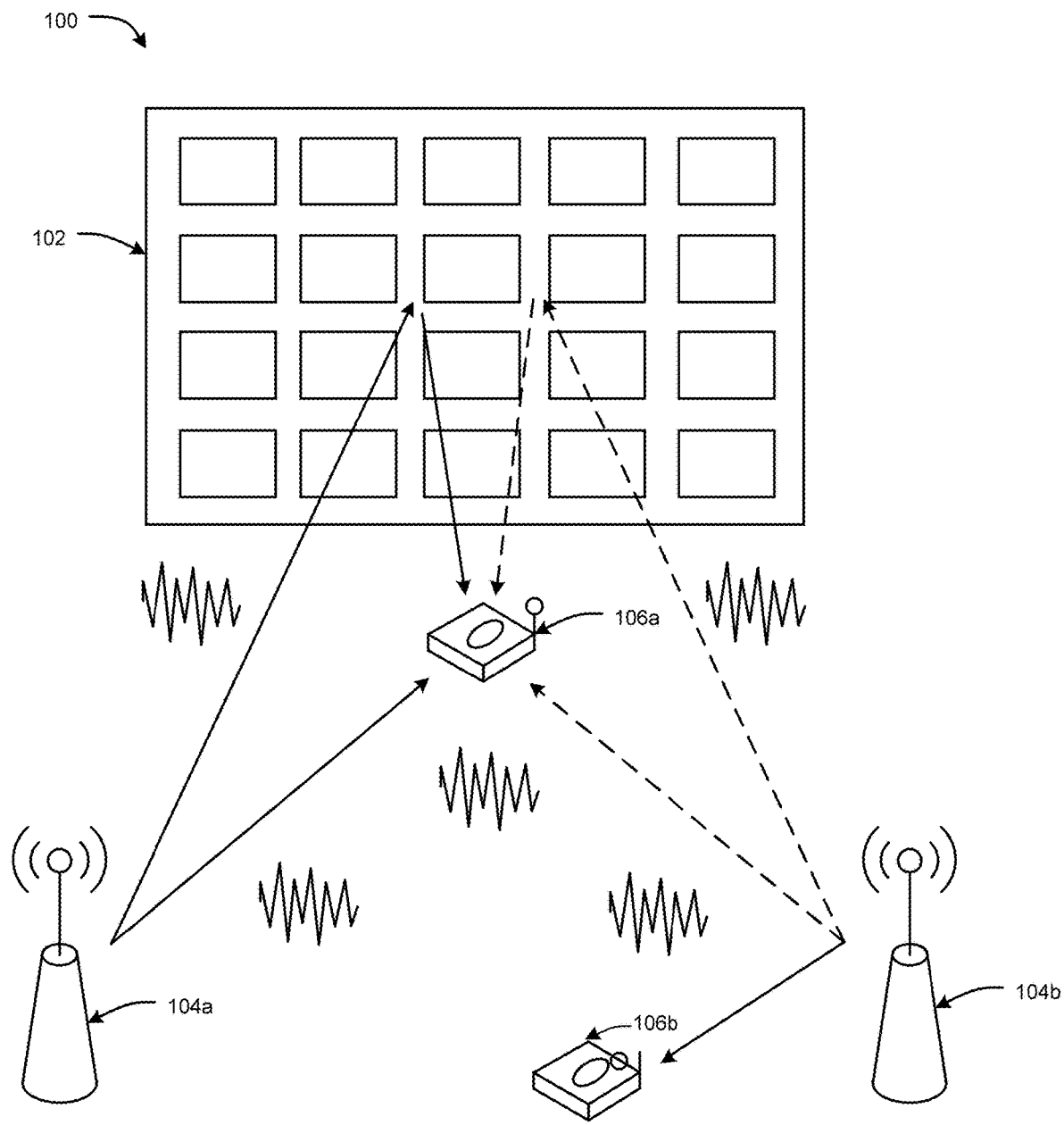
FIG. 1 illustrates a typical IRS deployment scenario in an exemplary 5G or 6G network architecture, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention.

Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

A new paradigm of wireless communication, the sixth-generation (6G) system, with the full support of artificial intelligence is expected to be deployed in the next few years. In 6G networks, some fundamental issues, which may need to be addressed include higher system capacity, higher data rate, lower latency, and improved quality of service (QOS) compared to 5G networks.

Even in the current fifth generation (5G) technologies, higher system capacity, higher data rate, lower latency, and improved quality of service (QOS) are desirable. The 5G networks still do not use the available or emerging technologies.

Further, it may be desirable that the future networks such as and not limited to 6G network are designed to achieve an expansion of human experience across physical, biological, and digital worlds. At the same time, it may be desirable for the 6G networks to enable next-generation industrial operations environment beyond Industry 4.0 (4$^{th}$ Industrial revolution) in various dimensions of performance. Such dimensions may include such as but not limited to positioning, sensing, ultra-reliability, energy efficiency and extreme real-time. 6G networks may provide novel radio and access architectures for both communications and sensing purposes, AI optimized wide area network (WAN) and data centre co-design, as well as dynamic orchestration of personalized services to revolutionize the long tail of niche consumer interests.

While demand for mobile broadband will continue to increase for consumers and enterprise alike, uptake of ultra-reliable and low latency will be largely driven by specialized and local use cases in conjunction with non-public networks, and often with augmented intelligence. This will happen as integral part of automated and secure network transformation that is anticipated and being attempted in the current 5G networks. Objects ranging from cars, industrial machines, and appliances to watches and apparel will learn and organize themselves to fulfil human needs by automatically adapting to human behaviour, environment, and business processes. Energy efficiency is yet another key design criterion for the design of 6G network architectures, since performance of the network will depend on the energy available in the respective architectural domains.

One of the most challenging requirements comes from remote control in conjunction with augmented reality and immersive media experience. In addition to extreme ultra-reliable low latency (URLLC) performance requirement, this would demand ultra-high rates of 100 Gbit/s or higher allowing uncompressed transmission of high quality 360-degree video. Such a demand will necessitate a degree of flexibility and specialization beyond 5G network capabilities. 6G networks must, therefore, be intent and open service driven and, in short, business needs will drive 6G product and service creation. Product and service creation will be an integral part of the automated e2e service workflow that is steered and guided by policy and intent. In other words, use case driven means to meet the diverse needs and preferences of each user or specialized 6G sub-network, whether human, physical machine, or digital twin. In summary, the key requirements for 6G architecture may include: (a) network programmability; (b) deployment flexibility; (c) simplicity and efficiency; (d) security, robustness, and reliability; and (c) automation.

The disclosed network architecture addresses the issue of network flexibility as proposed herein after. This disclosure also proposes 5G and 6G network architectures that accommodate network sensing as a built-in functionality. The present disclosure also proposes an IRS architecture for 5G and beyond 5G networks (e.g., 6G) that solves, at least partially, the issue of utilizing and converging at least one of the above-mentioned existing technologies. The disclosure provides for mechanisms for providing support by existing UEs to enable a successful network interface architecture between the network and the IRS.

FIG. 1 illustrates a typical IRS deployment scenario 100 in an exemplary 5G or 6G network architecture, in accordance with an embodiment of the present disclosure. In an embodiment, the main peculiarities of IRS include: no power amplification; operation at the RF level with no or limited digital signal processing; and multi-functional re-configurability. The disclosed embodiments of IRS architecture take into consideration these peculiarities and provides solutions to at least the problems highlighted above. As shown, the deployment scenario 100 includes an IRS 102 that is configured to reflect signals from base stations 104a and 104b to access points 106a and 106b.

Figure 2A:
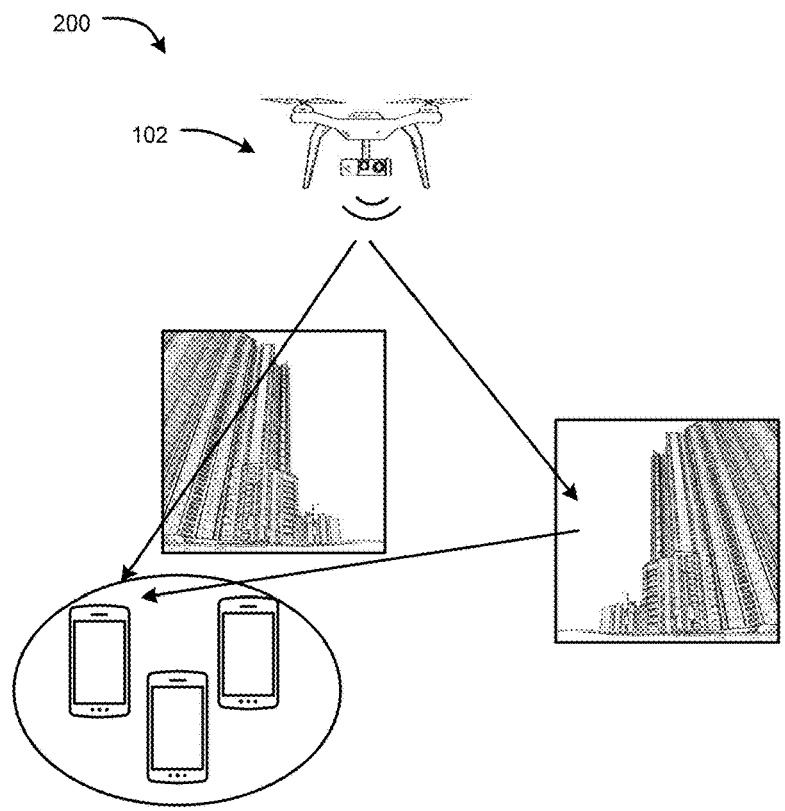
FIGS. 2a-2f illustrate exemplary use cases of IRS deployment, in accordance with an embodiment of the present disclosure.
Figure 2B:
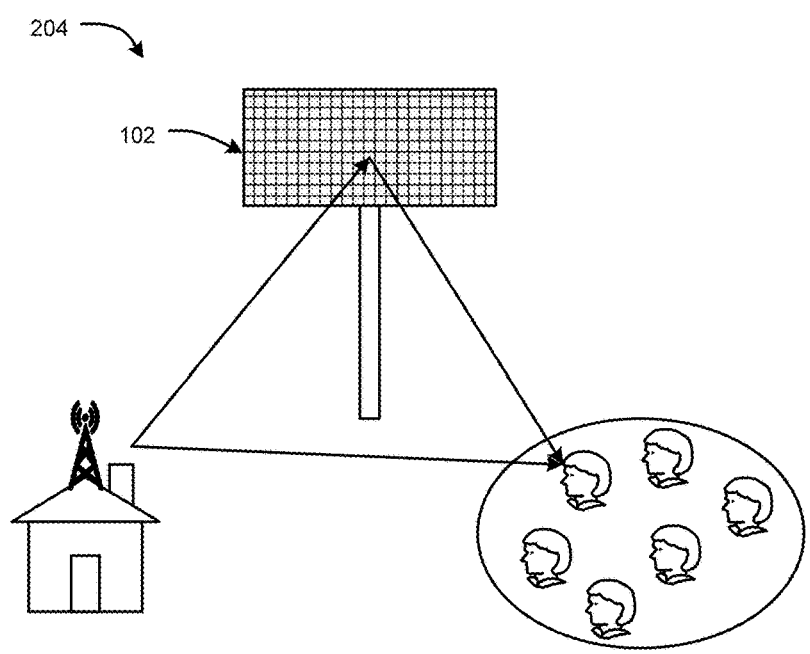
Figure 2C:
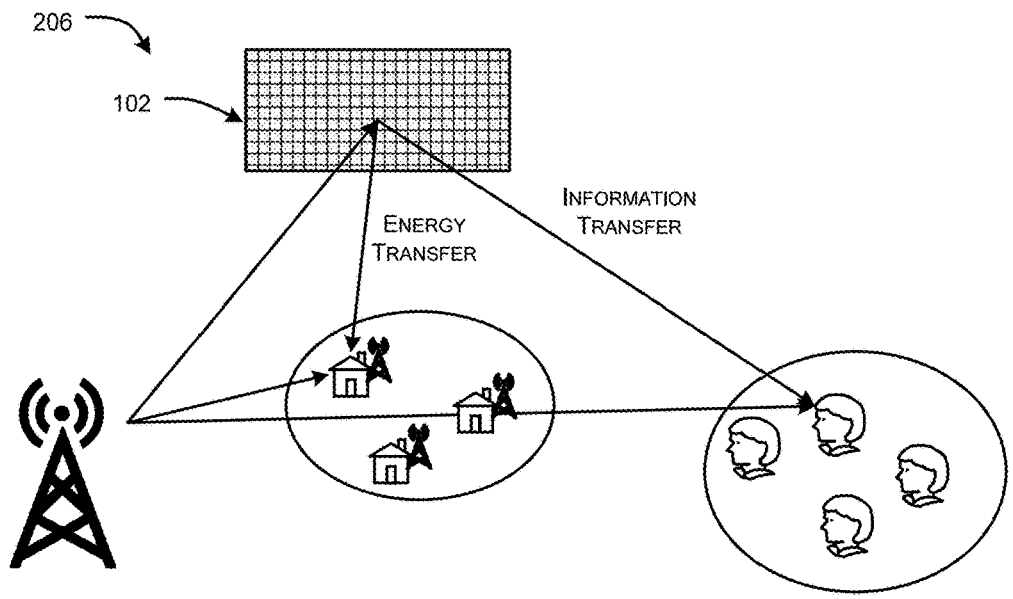
Figure 2D:
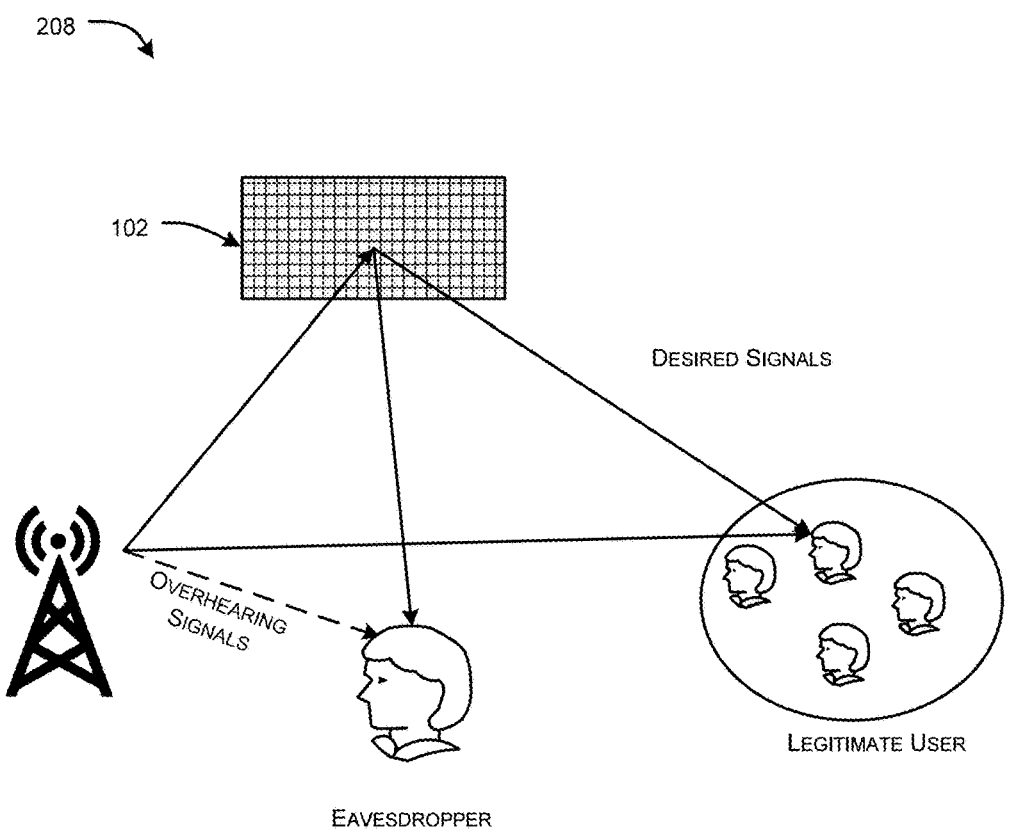
Figure 2E:
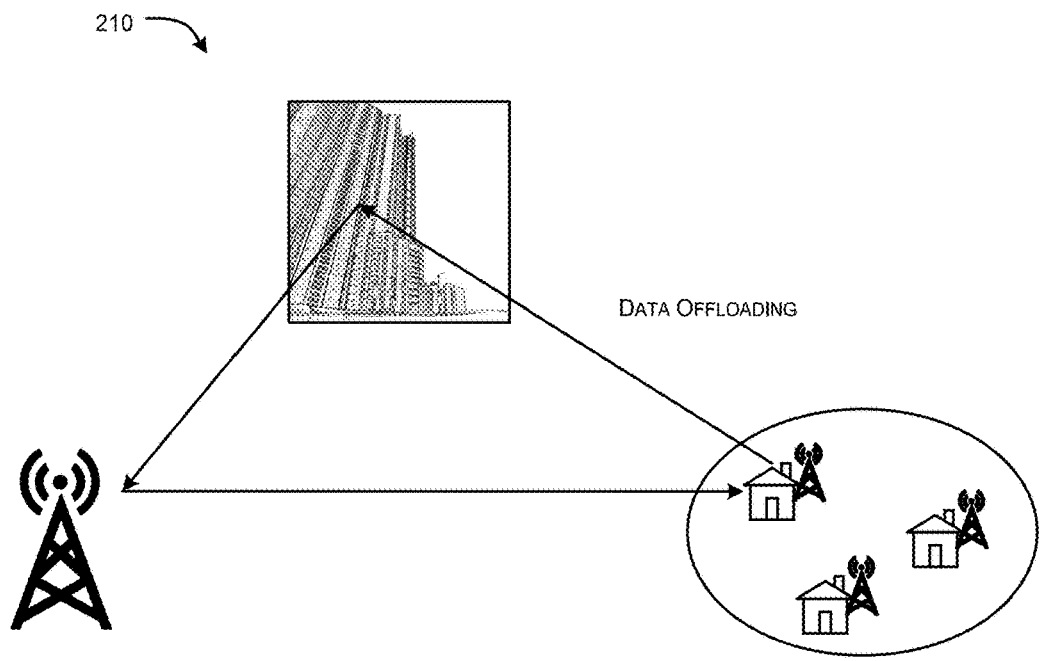
Figure 2F:
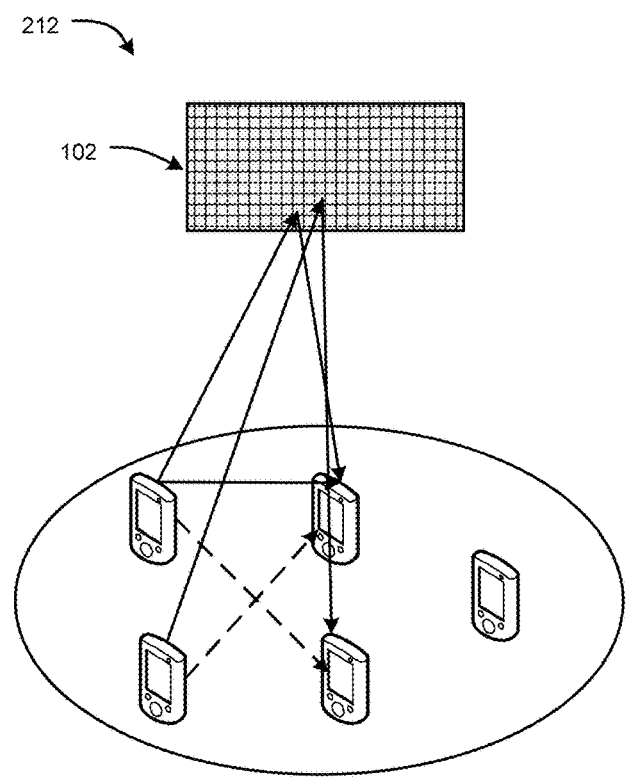

FIGS. 2a-2f illustrate exemplary use cases of IRS deployment, in accordance with an embodiment of the present disclosure. In general, the use cases that are currently being explored for IRS (interchangeably referred to in this description as RIS) include-use as smart nearly passive relays for coverage extension, use as single-RF multi-stream transmitter for capacity improvements, and use for information aided transmission in the context of ambient backscattering and symbiotic radio. For example, as shown in FIG. 2a, IRS deployment 200 is used in RIS-assisted Unmanned Arial Vehicle (UAV) 202. In yet another example, as shown in FIG. 2b, IRS deployment 204 is used for RIS-assisted mm Wave communication. In yet another example, as shown in FIG. 2c, IRS deployment 206 is used for RIS-assisted simultaneous wireless information and power transfer (SWIPT). In yet another example, as shown in FIG. 2d, IRS deployment 208 is used for RIS-assisted physical layer security. In yet another example, as shown in FIG. 2e, IRS deployment 210 is used for RIS-assisted mobile edge computing. In yet another example, as shown in FIG. 2f, IRS deployment 212 is used for RIS-assisted device to device (D2D) systems.

In general, RISs enable the control of the radio signals between a transmitter and a receiver in a dynamic and goal-oriented way thus turning the wireless environment into a service. This ability in terms of reconfiguring the wireless channel has motivated a host of potential enhancements of various network Key Performance Indicators (KPIs) such as capacity, coverage, energy efficiency, positioning, and security. This is in addition to the support of new capabilities such as sensing and wireless power transfer.

RISs introduce a new system node turning the wireless environment from a passive to an intelligent actor, so the channel becomes programmable. This trend will challenge basic wireless system design paradigms, creating an innovation opportunity, which will progressively impact the evolution of wireless system architecture, access technologies, and networking protocols.

Furthermore, reconfigurable intelligent surface (RIS) can construct an intelligent and programmable radio environment in a controllable way. RIS makes it possible to perform passive reflection, passive absorption, passive scattering and push the physical environment to change towards intelligent and interactive. RIS can change the electromagnetic characteristics of the elements and generate phase shift independently on incident signals without using any RF signal processing. Also, RIS technology has many technical features beyond current mainstream technology. Compared with massive MIMO, RIS-aided wireless network hugely improves the system performance via optimizing the smart signal propagation.

In addition, RIS element is completely passive and has low power consumption, making it environmentally friendly and sustainable green. RIS design does not need high-cost components such as ADC/DAC and power amplifier, and hence the feasibility of large-area deployment can be improved greatly. In addition, electromagnetic waves can be reconstructed at any point on its continuous surface, thus form any shape to adapt to different application scenarios and support higher spatial-resolution. RIS makes it possible to intelligently control the propagation environment, improve transmission reliability and achieve higher spectrum efficiency.

RIS can be applicable to one or more scenarios, for example, to overcome the Non-line of sight (NLOS) limitation and deal with the coverage hole problem in an environmentally friendly manner. Another scenario is to serve cell edge users, relieve multi-cell co-channel interference, expand coverage, and implement dynamic mobile user tracking. Further scenarios can be to reduce electromagnetic pollution and solve the multi-path problem. Yet another scenario is to use RIS for positioning, perception, holographic communication and enhance reality. Still further scenario is to realize sensing-communication integration.

Future, evolving communication systems in 5G and 6G networks will face a more complex wireless environment and higher service quality requirements, which will pose greater challenges to RIS architecture and design. Firstly, reasonable electromagnetic model and channel model may need to be established. The fundamental limitation and potential gains of RIS-aided communication systems may need to be explored. A new system and a method are required for channel estimation as no RF chain is configured in RIS.

Secondly, passive beamforming design and passive information transfer optimization are required in the design of IRS architecture. In addition, RIS deployment in 6G will bring a new network paradigm. Furthermore, research and development of new material is one of the bottlenecks in the development of RIS technology. New control mechanism can be explored through electromagnetic modelling, control methods and baseband characterization of meta-surface. Finally, as the theoretical research on electromagnetic propagation and channel models continues to grow, it is necessary to consider data-driven and model-driven AI optimization design to make full use of physical-layer features and improve algorithm efficiency.

As one new fundamental technology, RIS has the characteristics of low cost, low power consumption and easy deployment, supports future green communication, and enables future sensing-communication integration. IRS helps in enhancing the desired signal power while nullifying the reflected interference. Alternatively, the reflected interference can be tuned to cancel the direct interference (although more challenging to implement). This improves cell-edge user's SINR by creating a "signal hotspot" as well as "interference-free zone" in the vicinity of IRS. The present invention proposes IRS network architectures that can be implemented in all the above use cases/scenarios.

Figure 3:
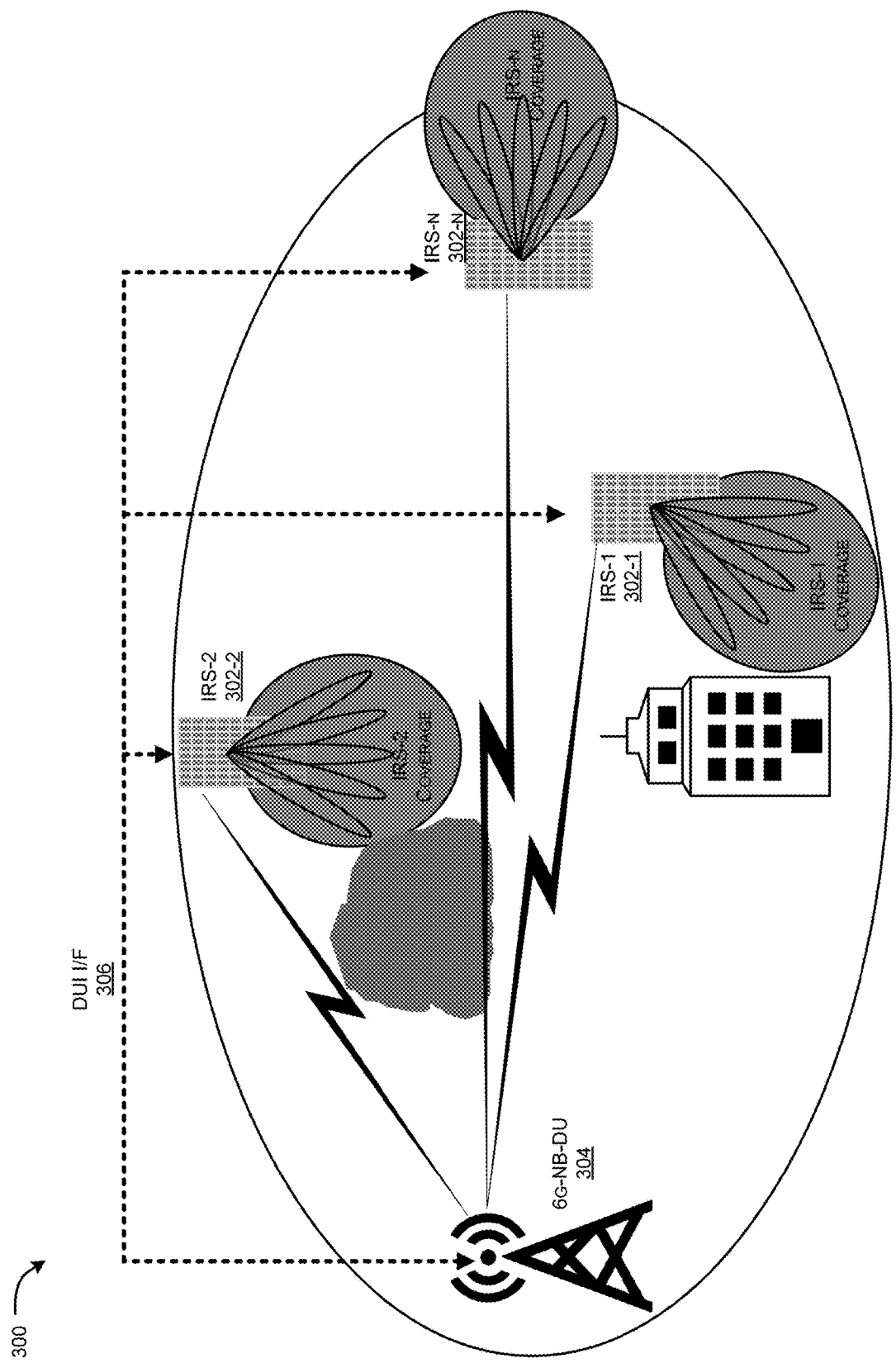
FIG. 3 illustrates an exemplary IRS coverage scenario, in accordance with an embodiment of the present disclosure.

FIG. 3 illustrates an exemplary IRS coverage scenario 300, in accordance with an embodiment of the present disclosure. As shown in the figure, there will be certain areas like behind some tall buildings, behind a small hill structure, or at the cell edges, where there will be a definite chance for signal degradation from a given base station (5G or 6G). In such areas, the base station (BS) signals can be improved by deploying IRS in the appropriate location with appropriate dimensions. Based on the dimension of the IRS, the beam width can be adjusted either vertically or horizontally to support one or more UEs affected by such signal degradation. In an embodiment, the beams can also be steered either vertically or horizontally. Based on the dimension of the IRS antenna elements, the maximum steering of a beam, both vertically and horizontally creates a virtual spherical area, which can be called as IRS coverage area. So, users suffering from signal degradation within this kind of spherical coverage area can get improved signals from the base station by using the reflected/regenerated beams from the associated IRS.

Referring to FIG. 3, the IRS-1 (302-1) is deployed in such a way that, it can receive direct signal from the base station 304 and can reflect/regenerate another beam to provide improved base station signal to the area behind a big building. Based on the number of antenna array elements supported by IRS-1 (302-1), the IRS-1 coverage is created virtually. Any UEs within this coverage can benefit from IRS-1 (302-1). Similarly, IRS-2 (302-2) is deployed closer to a small hill to aid the UEs suffering from poor coverage behind the hill.

In case of IRS-N (302-N) scenario, some cell edge UEs were receiving degraded signal from the serving base station and were often getting disconnected abruptly. In such a scenario, the IRS-N kind of deployment aids the cell edge UEs to provide stable and improved signals from the base station consistently. This enables the affected UEs to avoid unnecessary call drops and the IRS-N deployment improves the capacity of the serving cell by extending the coverage, based on the dimensions of the deployed IRS-N. In an embodiment, the base station 304 communicates with IRS-1, IRS-2, and IRS-N via the proposed DUI interface ("DUI I/F") 306.

In an embodiment, within a cell coverage, one or more IRSs can be deployed based on the nature of the geographical area of the cell coverage. The dimension of such IRSs can be same or different, based on the dimension of object obstructing the base station signal. In an embodiment, the obstructing objects may correspond to a tall building, a small hill, and therefore the attenuation is, all along the signal path up to the cell edge. In an embodiment, the deployment of an IRS can be either static, where the possible coverage holes within a cell coverage is know in advance and more or less permanent due to structures like building, tunnels, bridges, hills, trees, etc. In yet another embodiment, the deployment of an IRS can be dynamic, where the possible coverage hole within a cell coverage is temporary, like due to natural calamities, public safety scenarios, public gatherings, etc., in which cases, the IRS can be deployed via UAV. Air balloons, satellites, etc.

The disclosed embodiments propose an IRS and 5G/6G network interface architecture and also a communication protocol between the 5G/6G network and the IRS. Disclosed embodiments also propose a computation of the IRS tilt information (calculated) at the base station and transferred to the IRS via the proposed network interface.

In one embodiment the IRS tilt information is calculated based on SINR or the Reference Signal Received Power (RSRP) or Reference Signal Received Quality (RSRQ) information at the base station. In another embodiment, the beam forming for an IRS will be calculated based on the knowledge of the IRS location and the user location and the provided Channel Quality Indicator (CQI) information from the UE.

In one embodiment, the IRS tilt information is calculated as a precoding matrix or a beam forming or an IRS tilt matrix, also referred to as digital IRS steering or beamforming, as applied in using an antenna array to transmit one or multiple spatially directive signals simultaneously. Every antenna of the IRS transmit array emits a different signal, designed in the digital domain according to the optimization criteria arrived by using the information of the quality of signal as experienced by the UE. In an embodiment, the IRS applies the precoding matrix or a beam forming matrix provided by the base station scheduler entity to provide the directivity (beamforming), i.e., aligning the reflective angle of the IRS antenna elements towards the intended UE, and choosing the transmit power (power allocation). In particular, it is also an embodiment of the disclosure to use or allocate power and phases separately. In essence, precoding is a particular strategy chosen at the transmitter to convey information to one or multiple receivers. Furthermore, the IRS may be dynamically and automatically configured based on the requirements.

The disclosed mechanism provides for a method in which a base station (BS) is aware of an IRS so that the IRS tilt can be controlled considering a given user (or UE) distribution in the vicinity of a deployed IRS panel. In an embodiment, this is achieved by one or more base stations by considering the user (or UE) and the signal strength (SINR) distribution.

In one embodiment, the disclosed Base Station (BS) is aware of an IRS either through prior knowledge encoded in a database or via a signalling mechanism between the IRS and the BS (described later in the description). When an IRS comes up in the network or become active, it may be configured to send a handshake signal to all connected BSs via the available physical connection. One or more of the following information may be exchanged such as but not limited to: an IRS ID, a location in latitude/longitude etc. In an embodiment, the connection between the IRS and a BS can be via an RF connection (IAB, Microwave link etc.).

Figure 4:
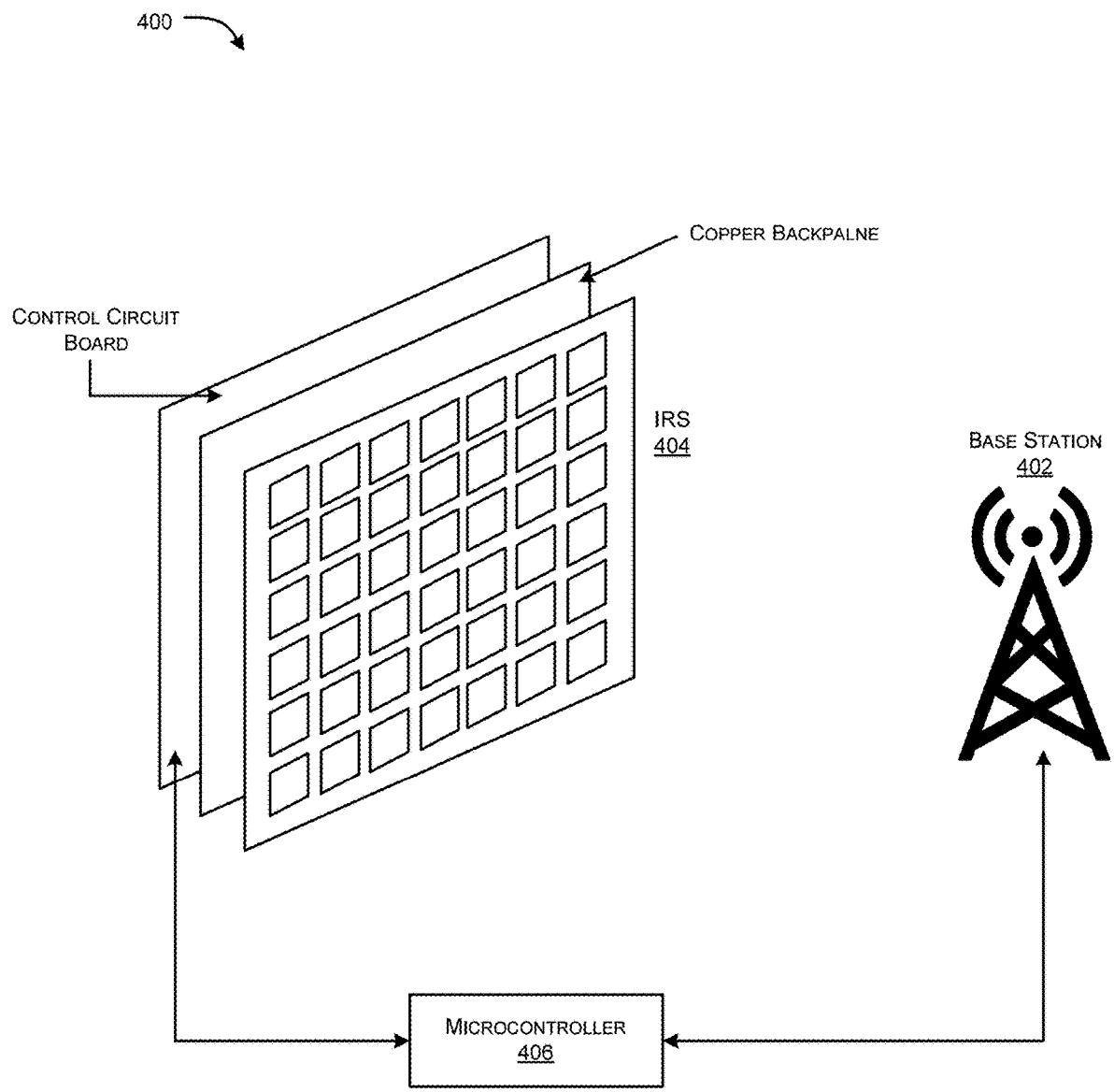
FIG. 4 illustrates an exemplary IRS deployment scenario, in accordance with an embodiment of the present disclosure.

A network interface protocol is disclosed that includes a handshake signal schema. In one embodiment, a mechanism of interfacing between the Base Station (BS) and an IRS panel is shown in FIG. 4. With reference to FIG. 4, a direct connection is established between the BS and the IRS via a micro controller (also referred to as IRS controller hereinafter) to implement the mechanism of computing a tilt control information for a given time period and conveying such information to the IRS via the connection.

There may be two aspects to controlling the IRS panel tilt by a BS. In an embodiment, the BS is configured to collect a signal-to-noise-plus-interference ratio (SINR) profile at the BS and then generate a RF Signature profile for the region in the vicinity of the IRS. In an exemplary embodiment, the SINR profile is collected via one or more enhanced user measurement reports generated by a UE in the region served by the BS and sent to the BS.

In another embodiment, the BS (or a scheduler module in BS) is configured to compute the tilts necessary to achieve a SINR objective and perform the same with one or more information elements such as but not limited to user distribution, user or SINR or Block Error Rate (BLER) profiles for a given region. In an embodiment, the tilt can be based on the user location information that can be obtained by the sensing mechanism implemented in the UE and such information is fed to the BS (scheduler).

The disclosed IRS architecture also describes a mechanism for collection of the above information from the UE and management of such collection mechanism. In an embedment, one or more control messages are transmitted from the BS to the IRS. In an embodiment, the periodicity of such control messages may be pre-configured based on the requirement or other factors.

In an embodiment, the IRS can be controlled by the BS using one or more control messages. In particular, the radio controller (Radio Resource Management entity or the baseband entity), the core network or any intelligent entities or network device such as but not limited to the O-RAN RIC (Radio intelligent controller) can communicate the control messages and control the IRS.

In one of the embodiments, a 6G NR DU and an IRS interface is proposed which has been referred to in this description as the "DUI I/F". It is implemented as a logical interface between a BS and an IRS controller, to exchange the signalling messages between the DU and the IRS as described in detail later in this description.

FIG. 4 illustrates an exemplary IRS deployment scenario, in accordance with an embodiment of the present disclosure. In one embodiment, a mechanism of interface between a Base Station (BS) and an IRS panel is provided. As shown, IRS 404 comprises a copper backplane and a control circuit board. The IRS 404 and Base station 402 communicate via a microcontroller 406 that may or may not be a part of the IRS 404 to exchange messages (e.g., control messages).

Figure 5A:
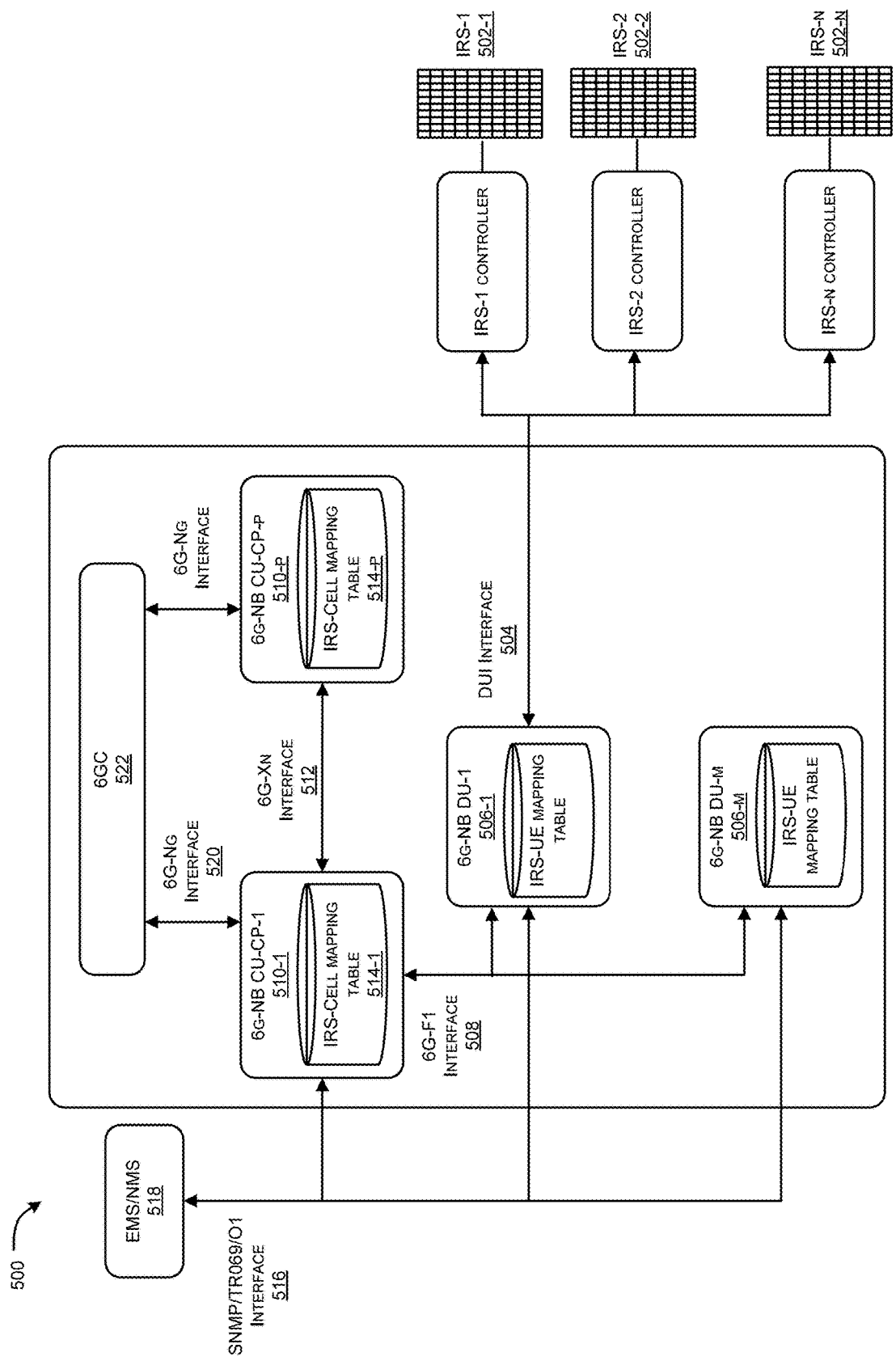
FIG. 5a illustrates an exemplary functional architecture of RAN interfacing with IRS, in accordance with an embodiment of the present disclosure.

FIG. 5*a* illustrates a functional architecture 500 of a next generation or future generation RAN (e.g., 6G RAN) with IRS support. For illustration purposes, various blocks or modules or subsystems of the disclosed base station or network device are shown in the architecture 500. In an embodiment, the 6g-NB-DUs (6G Base station Node DUs) 506-1 and 506-M support multiple cells and each cell can be connected to one or more IRS controllers (e.g., IRS-1 controller, IRS-2 controller, IRS-3 controller) via the proposed DUI I/F 504. Each of the IRS controllers correspond to IRS-1 (502-1), IRS-2 (502-2), and IRS-3 (502-3) respectively. In an embodiment, the 6g-NB-CUs (6G Base station Node CUs) 510-1 and 510-P maintain an IRS-Cell mapping table (e.g., 514-1 and 514-P) for each supported cell context as shown in the figure. The 6g-NB-CUs (6G Base station Node CUs) communicate with each other via 6G-XN interface 512. The 6g-NB-CUs (6G Base station Node CUs) communicate with the sixth generation code (6GC) 522 via 6G-NG interface 520.

In an exemplary embodiment, whenever an IRS is deployed in a cell, an entry is created in an IRS-Cell mapping table maintained in the 6g-NB-CU (6G Base station Node CU). In an embodiment, the entry includes an IRS-ID, IRS capabilities like number of antenna elements supported by the IRS, mechanical/electrical tilt support, active/passive support, geographical location like altitude, azimuth, elevation, coverage capabilities of the IRS, sharable/not sharable status, deployment details in cell edge/cell mid/cell centre regions, etc. In an embodiment, the above-mentioned information may be obtained either from Element Management System (EMS) or directly from the IRS controller during the (DU-IRS) DUI-AP (Application protocol) setup procedure (explained later with reference to FIGS. 7a-g). In an embodiment, the IRS-Cell mapping table may be managed or updated in real time or may be configured periodically. In yet another embodiment, the IRS-Cell mapping table may be managed as per a predetermined plan based on the network use cases/scenarios anticipated in a particular geolocation.

In an embodiment, a UE may be configured to frequently update or transmit its physical location information to the 6G-NB-CU-CP either using Radio Resource Control (RRC) Measurement Report message or a new RRC message like UE Location Info Update. Whenever the reported UE location is falling or coming closer to any pre-deployed IRS coverages, then the 6g-NB-CU-CP (e.g., 510-1) intimates the UE details, its location information, the associated IRS information to the 6g-NB-DU (e.g., 506-1). Thereafter, the 6g-NB-DU (e.g., 506-1) creates an entry in its IRS-UE mapping table and requests the given UE to start reporting the current location information, mobility speed, direction of travel, etc., while reporting periodic or a periodic channel state information (CSI) reports. When the given UE sends this additional information, the 6g-NB-DU (e.g., 506-1) verifies whether the UE has entered the IRS coverage area and if it is under the specific IRS. Thereafter, the 6g-NB-DU (e.g., 506-1) starts coordinating with the associated IRS controller (e.g., IRS-1 controller) and reserves the number of antenna array elements for reflecting the specific beam towards the UE.

If multiple UEs are present in the IRS coverage area, then the 6g-NB-DU determines whether different beams (other than the already generated beam) need to be created to serve those UEs. In an embodiment, it may be up to the 6g-NB-DU to determine whether to have only the reflected beam or both the direct beam and the reflected beam for the given UE. In case the UE is served by both the direct and the reflected beams, there may be no issues when the UE is crossing from the IRS coverage area into the normal cell coverage area served by the 6g-NB-DU (or BS). However, when the UE is served by only the reflected beam, then the 6g-NB-DU needs to closely track the UE movements crossing from the IRS coverage area into the normal cell coverage area and trigger the Intra-Cell Inter-beam handover at the appropriate instance.

In an embodiment, the 6g-NB-CU-CP can either activate or deactivate the usage of IRS by the 6g-NB-DU, by sending an IRS activate or an IRS deactivate message to the 6g-NB-DU via 6g-F1 interface 508. The 6g-NB-CU-CP (e.g., 510-1) updates/transmits the IRS details and usages to the EMS 518 frequently, via the SNMP/TR069/01 interface 516, which may be used for additional billing purposes if needed.

It may be appreciated by those skilled in the art that exemplary use cases described with respect to FIGS. 2a-2f may be implemented using the functional architecture 500 with IRS support/deployment. In general, the disclosed IRS architecture may be implemented to use as smart nearly passive relays for coverage extension, use as single-RF multi-stream transmitter for capacity improvements, and use for information aided transmission in the context of ambient backscattering and symbiotic radio. For example, as shown in FIG. 2a, IRS deployment 200 is used in RIS-assisted Unmanned Arial Vehicle (UAV) and can implement the disclosed IRS network architecture. In yet another example, as shown in FIG. 2b, IRS deployment 204 is used for RIS-assisted mm Wave communication and can implement the disclosed IRS network architecture. In yet another example, as shown in FIG. 2c. IRS deployment 206 is used for RIS-assisted simultaneous wireless information and power transfer (SWIPT) and can implement the disclosed IRS network architecture. In yet another example, as shown in FIG. 2d, IRS deployment 208 is used for RIS-assisted physical layer security and can implement the disclosed IRS network architecture. In yet another example, as shown in FIG. 2e, IRS deployment 210 is used for RIS-assisted mobile edge computing and can implement the disclosed IRS network architecture. In yet another example, as shown in FIG. 2f, IRS deployment 212 is used for RIS-assisted device to device (D2D) systems and can implement the disclosed IRS network architecture.

Figure 5B:
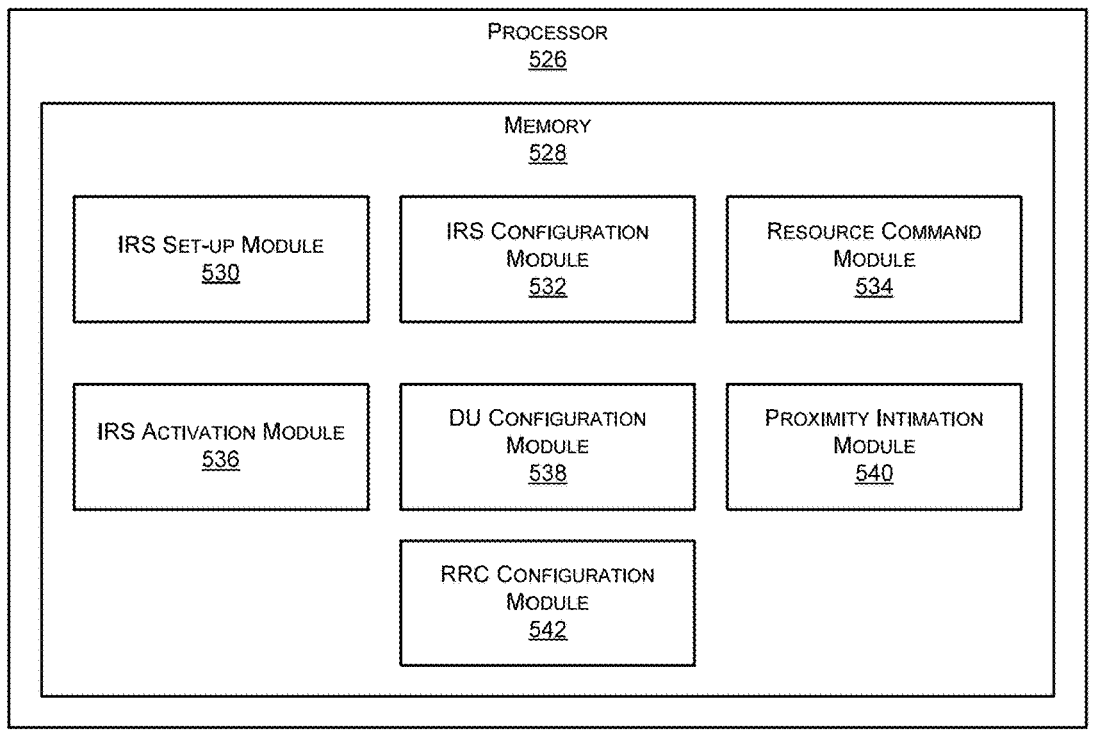
FIG. 5b illustrates an exemplary network device implemented in the IRS network architecture in accordance with an embodiment of the present disclosure.

FIG. 5b illustrates a network device 524 in accordance with an embodiment. One or more components of the 6G network or 5G network described with reference to FIG. 5a can be integrated and implemented as the proposed network device 524.

In an embodiment, the network device 524 may include one or more processors 526 coupled with a memory 528, wherein the memory may store instructions which when executed by the one or more processors may cause the network device 524 to implement the disclosed IRS architecture. The one or more processor(s) (526) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (526) may be configured to fetch and execute computer-readable instructions stored in a memory 528 of the network device 524. The memory 528 may be configured to store one or more computer-readable instructions or routines in a non-transitory computer-readable storage medium, which may be fetched and executed to create or share data packets over a network service. The memory 528 may comprise any non-transitory storage device including, for example, volatile memory such as RAM, or non-volatile memory such as EPROM, flash memory, and the like.

The memory 528 includes one or more modules such as IRS Set-up module 530, IRS Configuration module 532, Resource Command module 534, IRS Activation module 536, DU Configuration module 538, Proximity Intimation module 540, and RRC Configuration module 542. The IRS Set-up module 530 is configured to execute one or more steps or procedures (e.g., 700) for the initial set-up of an IRS. The IRS Configuration module 532 is configured to execute one or more steps or procedures (e.g., 706) for configuration of the IRS as detailed later in the description. The Resource Command module 534 is configured to execute one or more steps or procedures (e.g., 708) to command the reservation of antenna array elements (or other resources) of the IRS for communication with UE. The IRS Activation module 536 is configured to execute one or more steps or procedures (e.g., 710, 720) to activate or deactivate the IRS. The DU Configuration module 538 is configured to execute one or more steps or procedures (e.g., 712) indicating the latest set of IRSs deployed and their details. The Proximity Intimation module 540 is configured to execute one or more steps or procedures (e.g., 716) whenever one or more UEs (e.g., 718) are detected in the proximity of the specific IRS coverages. The RRC Configuration module 542 is configured to execute one or more steps or procedures for Radio Resource Control (RRC) connection reconfiguration. The RRC connection reconfiguration procedure is used to configure the measurement control in order to add a location information of the UE in one or more measurement reports received from the UE.

In an embodiment, the one or more modules described above may be configured to perform one or more functions, steps, procedures described herein in the context of 6G network. For instance, all the steps for implementing a communication protocol (and protocol stack thereof) between the 6G network and one or more IRSs can be performed by the network device 524. Furthermore, steps, procedures involved in configuration and/or setting up of one or more IRSs can also be performed by the network device 524. Furthermore, the steps or procedures of setting-up the UE to periodically send measurement reports can be performed by the network device 524 for example, by the RRC Configuration module 542.

In addition, the steps or procedures for processing and analyzing the measurement reports from the UE to determine tilts (i.e., tilt information) for the IRS can be performed by the network device 524. Although, different nodes or modules may have been described as performing various functions and steps for providing disclosed IRS architectures, it may be appreciated that all or some of the functions may be performed by one or more network devices 524. For instance, the network device 524 may be a 6G enabled network device that includes one or more processors 526 coupled to the memory 528 storing a set of instructions which when executed by the one or more processors cause the network device to compute IRS tilt information associated with the one or more IRSs based at least in part on a first set of information received from the one or more UEs. The first set of information comprises one or more of signal-to-noise-plus-interference ratio (SINR) information, Reference Signal Received Power (RSRP) information, and Reference Signal Received Quality (RSRQ) information received from the one or more UEs.

The one or more processors 526 further cause the network device 524 to communicate the computed IRS tilt information to the one or more IRSs via a network interface, wherein the IRS tilt information is used to control one or more operational aspects of the one or more IRSs. The one or more operational aspects of the one or more IRSs include mechanical aspects such as but not limited to mechanical tilt. In an embodiment, the one or more operational aspects of the one or more IRSs include digital aspects such as a digital tilt. In an embodiment, the one or more operational aspects of the one or more IRSs include electrical aspects such as but not limited to transmission power. It may be appreciated that each of the one or more IRSs include a plurality of tiles or panels. In an exemplary embodiment, the disclosed operational aspects of the one or more IRSs can be controlled at various levels of granularity, for example, at a tile level, at a panel level, and so on.

In an embodiment, the one or more processors 526 further cause the network device 524 to compute the IRS tilt information based on one or more of location of the one or more IRSs, location of the one or more UEs, and channel quality indicator (CQI) information from the one or more UEs, wherein the IRS tilt information is indicative of beam forming for the one or more IRSs.

In an embodiment, the one or more processors 526 further cause the network device 524 to compute the IRS tilt information as a precoding matrix or a beam forming or an IRS tilt matrix that is used to transmit one or multiple spatially directive signals simultaneously from each of the one or more IRSs, wherein each of the one or more IRSs comprises of a plurality of antennas. In an embodiment, every antenna of the one or more IRS transmit array is configured to emit a different signal, designed in digital domain based on the respective IRS tilt information. In an embodiment, the one or more IRSs apply the precoding matrix or the beam forming matrix provided by the network device 524 to provide directivity towards an intended UE of the one or more UEs and choose a corresponding transmit power.

In an embodiment, the one or more IRSs uses the IRS tilt information to compute a digital tilt and a mechanical tilt for each of the antennas and to allocate power and phases to each of the antennas. In an embodiment, the one or more processors 526 further cause the network device 524 to be aware of the one or more IRSs either through prior knowledge encoded in a database or via a signalling mechanism established between the one or more IRSs and the network device via the network interface. In an embodiment, the one or more processors 526 further cause the network device 524 to receive a handshake signal from a new IRS when activated via a physical connection between the new IRS and the network device during a setup process.

In an embodiment, the one or more processors 526 further cause the network device 524 to create an entry in an IRS-Cell mapping table, wherein the entry comprises one or more fields comprising an IRS-ID, IRS capabilities in terms of number of antenna elements supported by the new IRS, a mechanical/electrical tilt support, an active/passive support, a geographical location like altitude, azimuth, elevation, coverage capabilities of the IRS, a sharable/not sharable status, deployment details. In an embodiment, the network interface implements a network interface protocol that is established between the network device and the one or more IRSs, wherein the network interface protocol includes a handshake signal schema.

In an embodiment, the network interface is established through a direct connection between the network device 524 and the one or more IRSs via a micro controller. In an embodiment, the one or more processors 526 further cause the network device 524 to compute the IRS tilt information necessary to achieve a SINR objective based on one or more of a user distribution, user profiles, SINR profiles, and Block Error Rate (BLER) profiles for a given region serviced by the network device. In an embodiment, the one or more processors 526 further cause the network device 524 to send one or more control messages to the one or more IRSs at a pre-configured periodicity, wherein the one or more IRSs are controlled by the network device using the one or more control messages.

In an embodiment, various modules may be integrated together or may be implemented in multiple network devices (524) to achieve the same or similar functionality without departing from the scope of the ongoing description. For instance, the network device 524 corresponds to one or more nodes in the next generation RAN (e.g., 6G RAN) with IRS support. In an embodiment, the network device 524 may correspond to 6g-NB-DUs (6G Base station Node DUs) and/or the 6g-NB-CUs (6G Base station Node CUs) or an integration thereof. In yet another embodiment, the network device 524 may correspond to a Base Station (BS) or any such network entity that can be configured to communicate with IRS and/or UE in the context of the ongoing description.

In an embodiment, the network device 524 enables a network interface protocol establishment with the IRS as described with reference to FIGS. 7a-7g. In an embodiment, a DU-I interface (or DU I/F) is established between the network device and the IRS using various setup procedures outlined herein. Using the proposed network interface, the network device 524 may enable setting-up of an IRS that is available for reflecting signals to one or more UEs in a particular region or area serviced by the network device 524. A mapping of one or more parameters of the IRS to a mechanical or digital tilt for optimal performance is predetermined and stored at the network device 524. The network device 524 receives one or more measurement reports from the one or more UEs to determine, in run-time, the optimal mechanical or digital tilt based at least in part on the predetermined mapping. The network device 524 sends the optimal mechanical or digital tilt information using the proposed network interface to the IRS and the IRS controller uses the optimal tilt information to re-align the IRS panels or IRS tiles.

In yet another embodiment, the network device 524 performs all the functions, steps, procedures to instruct the UE to perform measurement of one or more parameters associated with the IRS or otherwise. For instance, the network device (524) may provide/configure trigger events in the UE to trigger any such measurements. Such measurement may be performed by the UE and sent to the network device 524 in the form of one or more measurement reports. The network device 524 may determine a tilt information or data to be communicated to the IRS controller based on the one or more measurement reports. In yet another embodiment, the network device 524 enables configuration of IRS in such a manner that the IRS controller reserves a portion of the IRS resources for the network device 524. Likewise, another network device 524 may share the resources of the IRS by configuring yet another portion of the IRS resources by communicating with the IRS controller as described herein.

Figure 5C:
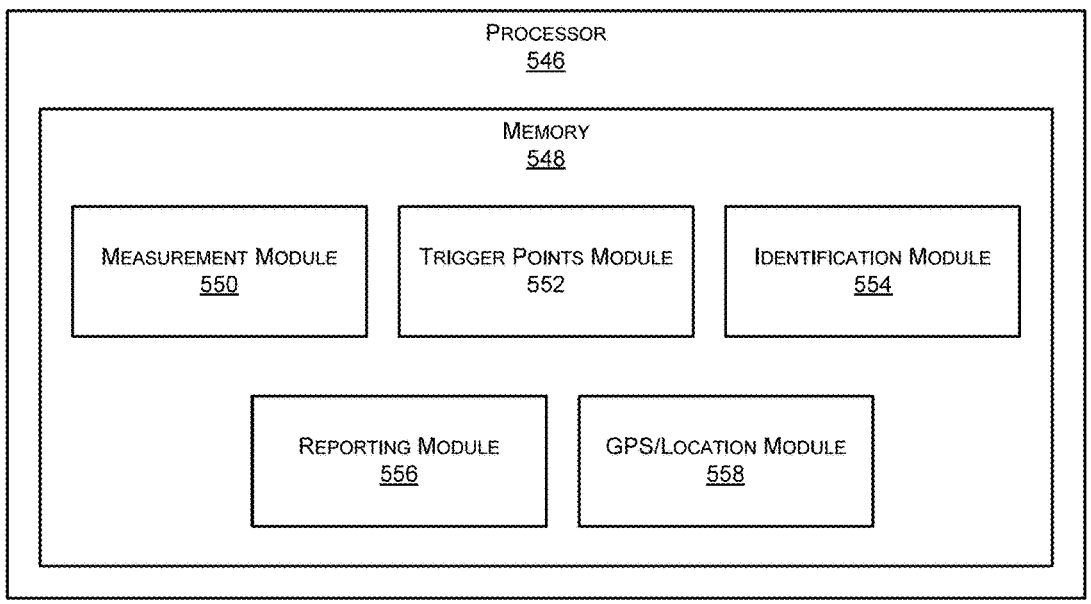
FIG. 5c illustrates an exemplary UE, in accordance with an embodiment of the present disclosure.

In an embodiment, a User Equipment (UE) in communication with one or more Intelligent Reflecting Surface (IRSs) and one or more network devices is disclosed as shown in FIG. 5C. FIG. 5c illustrates an exemplary UE 544 in accordance with an embodiment of the present disclosure. In an embodiment, the UE, or the computing device (shown in various figures) may communicate with the network device 524 and/or a given IRS via a set of executable instructions residing on any operating system. In an embodiment, the electronic devices may include, but are not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as a touchpad, touch-enabled screen, electronic pen and the like. It may be appreciated that the electronic devices may not be restricted to the mentioned devices and various other devices may be used. A smart computing device may be one of the appropriate systems for storing data and other private/sensitive information.

In an embodiment, the UE 544 includes a processor 546 coupled to a memory 548. The memory 548 includes one or more modules such as Measurement module 550, Trigger points module 552, Identification module 554, Reporting module 556, and GPS/Location module 558. The one or more modules in the memory 548 may be configured to perform one or more functions pertaining to UE side of the procedures/steps disclosed herein, for instance, with reference to FIGS. 8a-8c.

By way of example, the Measurement module 550 may be configured to measure one or more parameters associated with the signal strength received from the BS (or network device) and the signal strength received from the IRS. In yet another example, the Trigger points module 552 may be configured to enable setting or configuration of one or more trigger points for triggering measurement of the one or more parameters by the Measurement module 550. The Identification module 554 may be configured to enable identification of IRS based on identification parameters such as IRS ID etc. The Reporting module 556 may be configured to create and share one or more measurement reports in a prescribed format having one or more predetermined fields. The GPS/Location module 558 may be configured to determine or provide the location specific information to the other modules for inclusion in the measurement reports. One or more of the modules may be integrated to form a single module without departing from the scope of the ongoing description. Other components and modules of a standard UE are not shown in the figure or described herein for the purposes of brevity. For instance, communication components such as antennas, memory storage for reports and associated data, etc. are assumed to be part of the UE described herein. Certain modules of UE enable 544 may be configured to respond to one or more messages from the network device 524 or a BS to implement the IRS architecture disclosed herein or to support various embodiments of disclosed IRS mechanisms thereof.

As described above, the UE 544 comprises one or more processors coupled to a memory storing a set of instructions which when executed by the one or more processors cause the network device to transmit a first set of information. In an embodiment, the first set of information comprises one or more of signal-to-noise-plus-interference ratio (SINR) information, Reference Signal Received Power (RSRP) information, Reference Signal Received Quality (RSRQ) information, location and channel quality indicator (CQI) information associated with the UE to the one or more network devices. The one or more network devices are configured to compute IRS tilt information associated with the one or more IRSs based at least in part on the first set of information received from the one or more UEs. The one or more network devices are configured to communicate the computed IRS tilt information to the one or more IRSs via a network interface, wherein the IRS tilt information is used to control one or more operational aspects of the one or more IRSs.

Figure 6:
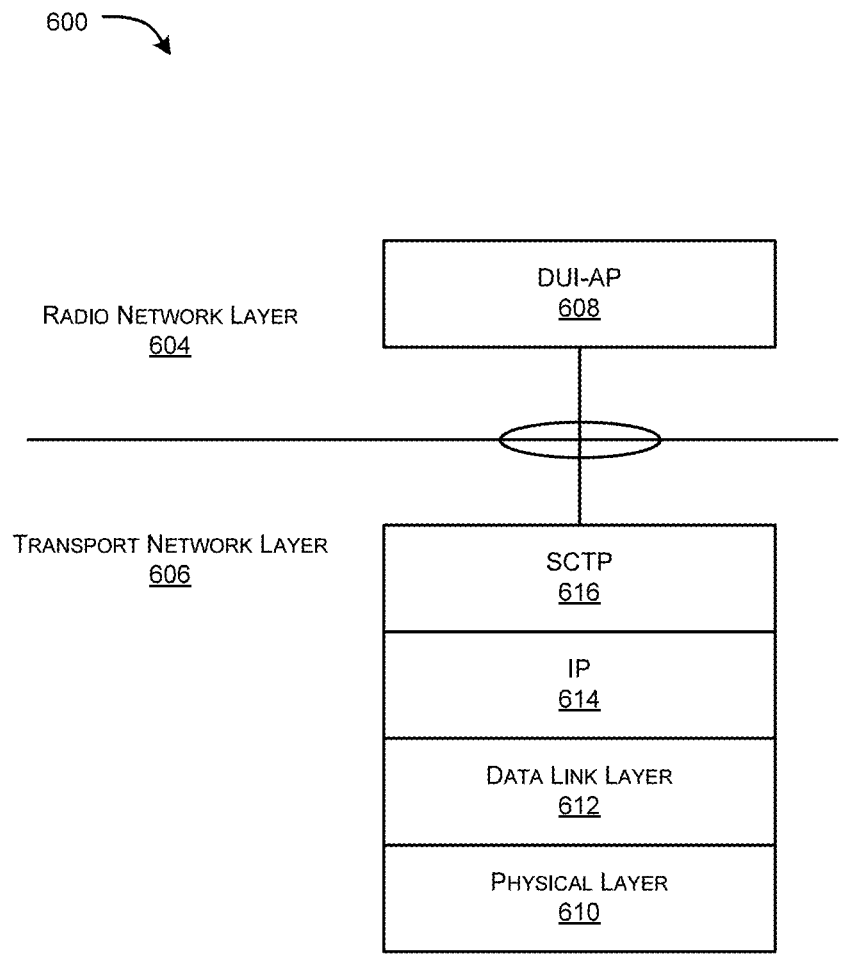
FIG. 6 illustrates exemplary DUI protocol interface stack, in accordance with an embodiment of the present disclosure.

FIG. 6 illustrates a DUI (DU-IRS) Interface protocol stack 600 in accordance with an embodiment of the disclosure. As shown, the protocol stack includes radio control layers 604 and transport control layers 606. The radio control layers 604 include the (DU-IRS) DUI-AP (Application protocol) layer 608. The transport control layers include the physical layer 610, data link layer 612, IP layer 614, and Stream Control Transmission Protocol 616. In an embodiment, the network device (524) or the BS establishes the DUI (DU-IRS) protocol stack to enable communication between the BS and the IRS for configuration, set-up and control purposes as described herein. Various configuration messages with specific format may be used to support the communication protocol in the context of 6G networks.

Figure 7A:
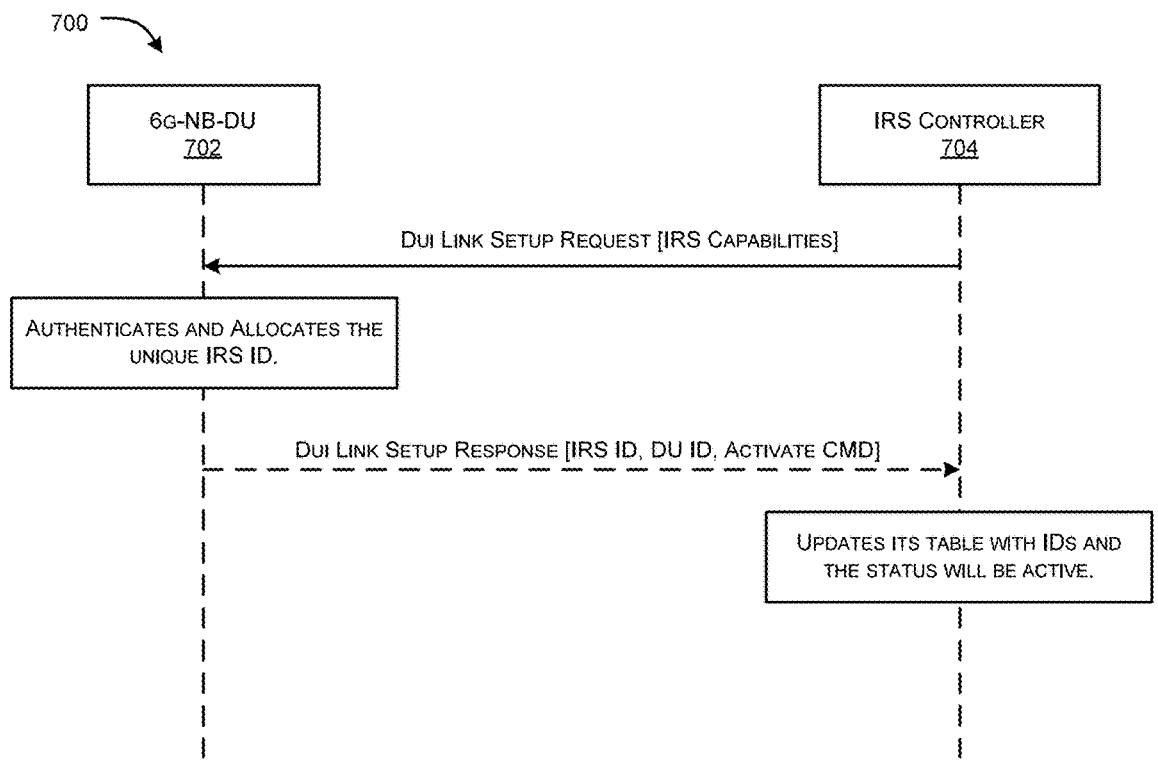
FIGS. 7a-7g illustrate the exemplary steps involved in the interfacing protocol between RAN and IRS, in accordance with an embodiment of the present disclosure.
Figure 7B:
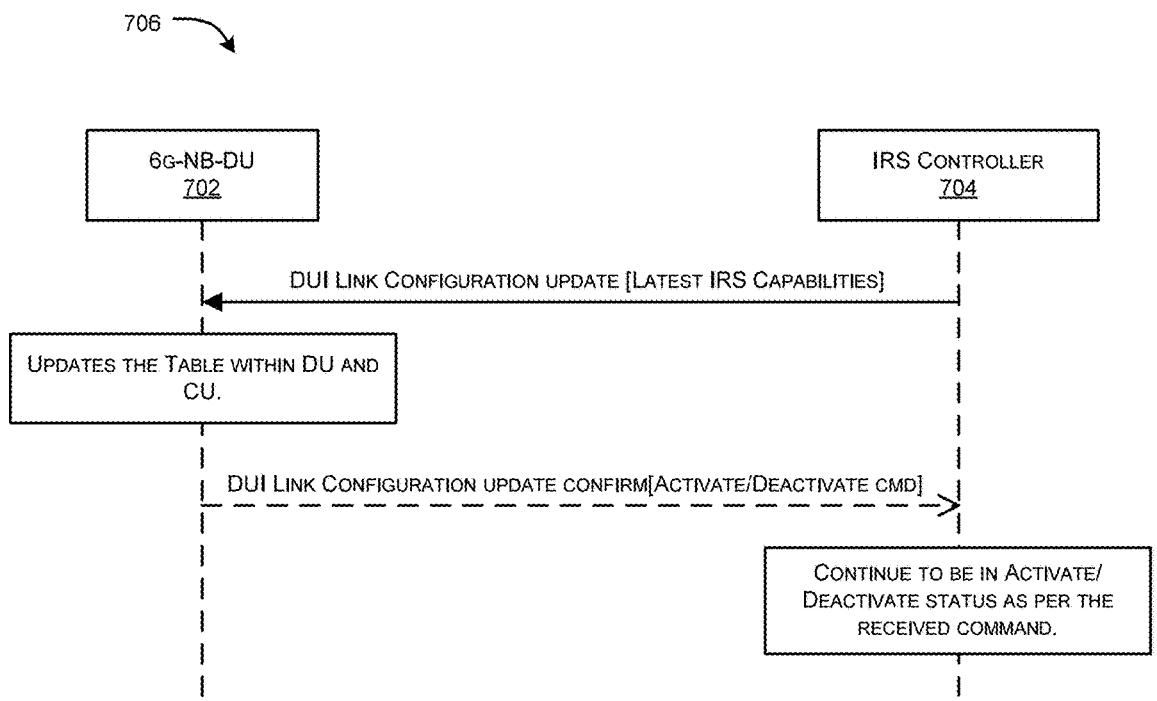
Figure 7C:
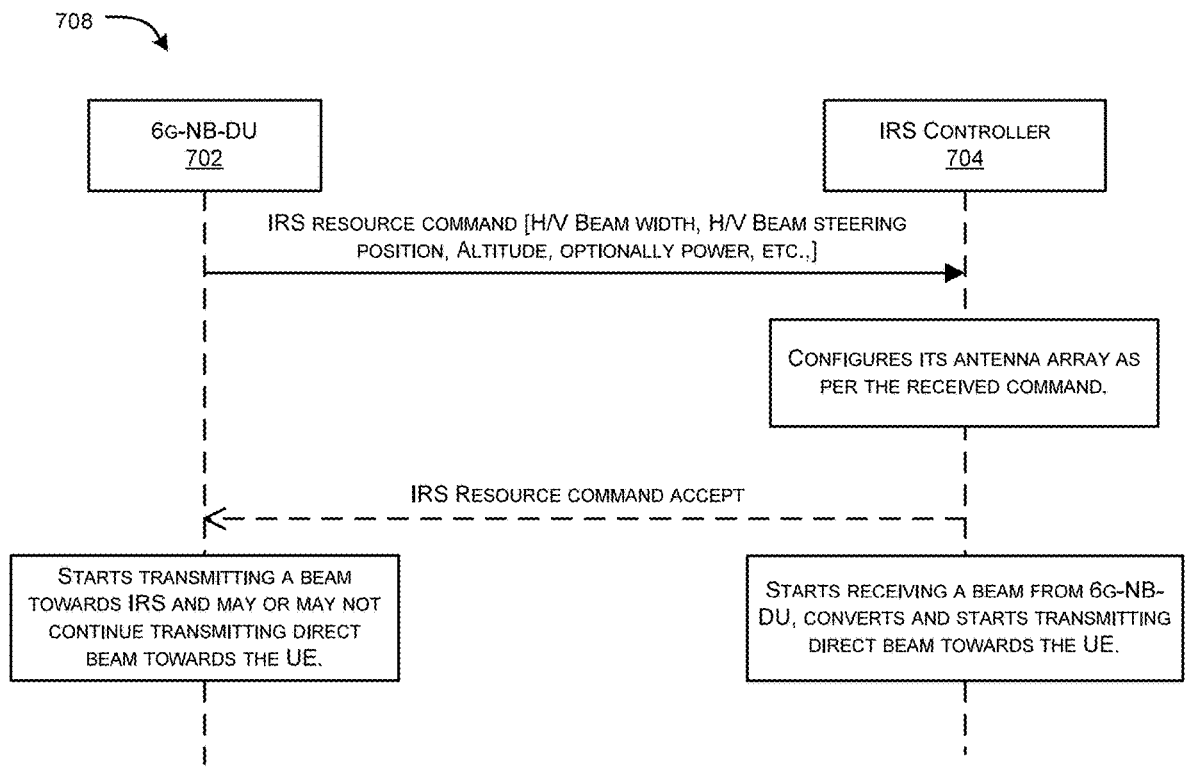
Figure 7D:
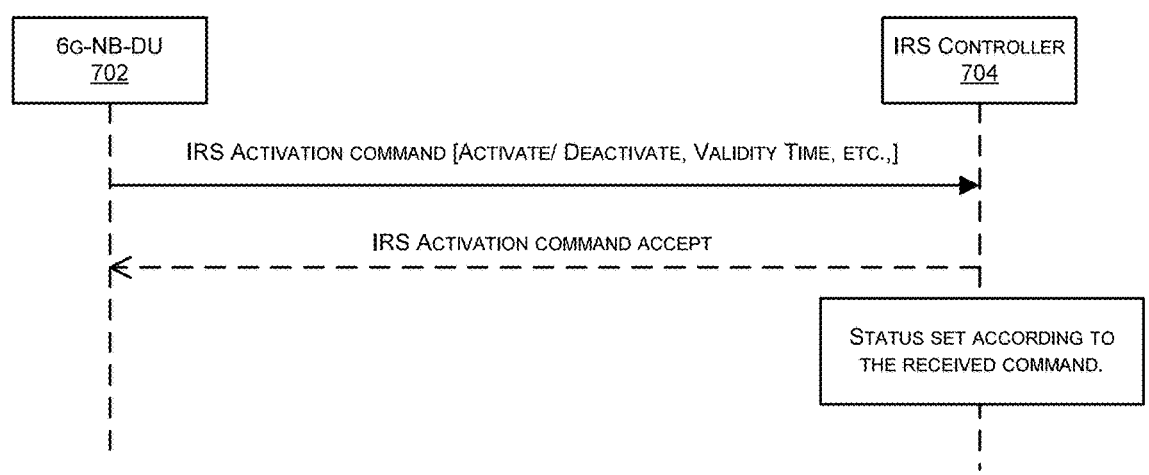

In an embodiment, DUI may be implemented as a logical or physical interface between a DU and an IRS controller. The disclosed DUI protocol stack is implemented at both the ends of the DUI interface. For example, one implementation is at the DU end and the other implementation is at the IRS controller end. The Transport network layer, which includes the Physical Layer, Data Link layer, IP layer and the SCTP layer may be implemented as per the standard definitions known in the art. In an embodiment, the Radio Network layer that includes DUI-AP that is DU-IRS interface Application component implements layer3 control protocol. The procedures and the messages associated with DUI-AP will be explained in detail with reference to sequence diagrams shown in FIGS. 7a-7d. For example, protocol communication messages include "DUI LINK SETUP REQUEST" and "DUI LINK SETUP RESPONSE" as shown in FIG. 7a, "DUI LINK CONFIGURATION UPDATE" and "DUI LINK CONFIGURATION UPDATE CONFIRM" as shown in FIG. 7b, "IRS RESOURCE COMMAND" and "IRS RESOURCE COMMAND ACCEPT" as shown in FIG. 7c, "IRS ACTIVATION COMMAND" and "IRS ACTIVATION COMMAND ACCEPT" as shown in FIG. 7d. The proposed protocol communication messages are part of the proposed DUI-AP protocol.

In an embodiment, the DUI-AP may be realized by an initial set of procedures used in the DUI I/F as illustrated in FIGS. 7a-7g.

FIG. 7a illustrates a DU I/F setup procedure 700 is initiated by the IRS controller 704 towards the 6g-NB-DU 702, to establish the DUI link. In an embodiment, when a new IRS comes up or become active or available, the corresponding IRS controller (e.g., 704) shares/sends its capabilities to the 6g-NB-DU 702 via a setup request message. The 6g-NB-DU 702 authenticates the new IRS and allocates a unique IRS ID and issues the "Activate" command to the IRS controller 704 by sending the setup response message. The IRS controller 704 updates its tables with IDs and the status is set to "active".

FIG. 7b illustrates a DU I/F Configuration update procedure 706. This procedure is initiated by the IRS controller 704 towards the 6g-NB-DU 702, to update the changes in its capabilities. In an embodiment, the IRS controller 704 shares its updated capabilities to the 6g-NB-DU 702 via the "Configuration update" message. The 6g-NB-DU 702 updates its IRS-UE table and sends the updates to the associated 6g-NB-CU-CP and issues the "Activate/Deactivate" command based on the updates to the IRS controller 704 by sending the "Configuration update confirm" message. Thereafter, the IRS controller 704 continues to be in "activate/deactivate" status as per the received command.

FIG. 7c illustrates an IRS Resource Command procedure 708. This procedure is initiated by the 6g-NB-DU 702 towards the IRS controller 704, to command the reservation of antenna array elements for communication with 6g-NB-DU 702 and also to communicate with a UE directly. Therefore, one set of antenna array (of the given IRS) may be reserved for communications with the 6g-NB-DU 702 for a particular UE and another set of antenna array is reserved for communications with the UE directly. Here, the 6g-NB-DU 702 can share the details like horizontal and vertical beam width, horizontal and vertical beam steering position, altitude of the given UE to point the beam towards, etc. Therefore, the 6g-NB-DU 702 sends the IRS resource command message to the IRS controller 704. The IRS controller configures the antenna array of the IRS as per the received command, reserves the required antenna array elements and responds to 6g-NB-DU 702 by sending IRS Resource Command accept message. The IRS resource command can also contain the pre-coded matrix that provides the power and phase for each element that the IRS should employ to achieve the necessary directionality in the reflection of the signals from the base station. Upon receipt of the IRS Resource Command accept message, the 6g-NB-DU 702 starts transmitting a beam towards the IRS and may or may not continue transmitting direct beam towards the UE. The IRS controller 704 configures the IRS to start receiving the beam from 6g-NB-DU 702, convert and start transmitting direct beam towards the UE.

FIG. 7d illustrates an IRS Activation command procedure 710. This procedure is initiated by the 6g-NB-DU 702 towards the IRS controller 704, to activate or deactivate the IRS. The 6g-NB-DU 702 sends an IRS activation command (activate/deactivate, validity time, etc.) message to the IRS controller 704. The IRS controller 704 sends an IRS activation command accept message to the 6g-NB-DU 702. The IRS controller 704 is configured to set the status of the IRS according to the received command. In an embodiment, this procedure is predominantly used during the energy saving scenarios and during maintenance scenarios.

Figure 7E:
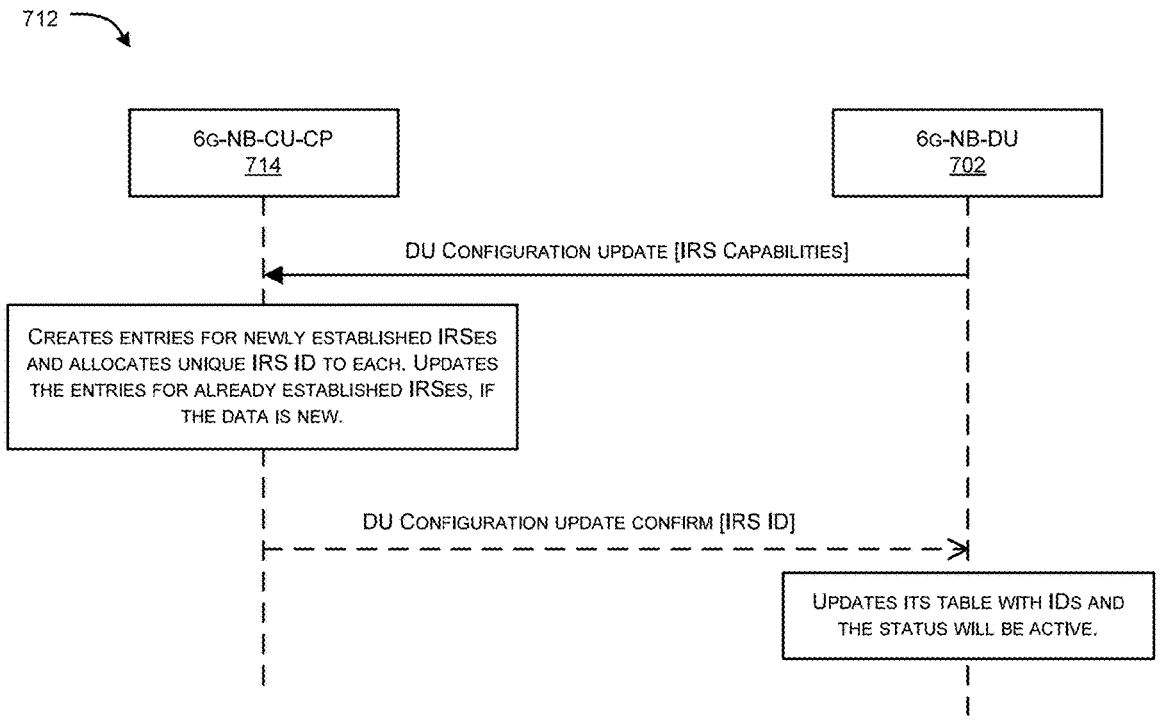
Figure 7F:
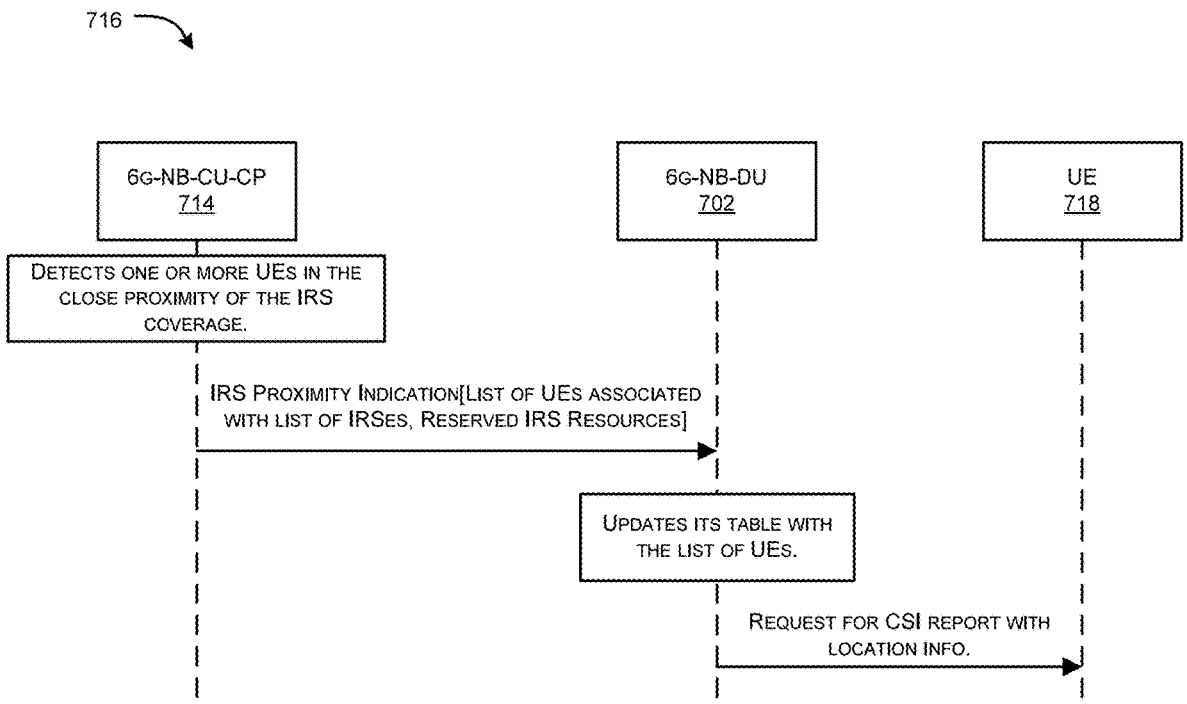
Figure 7G:
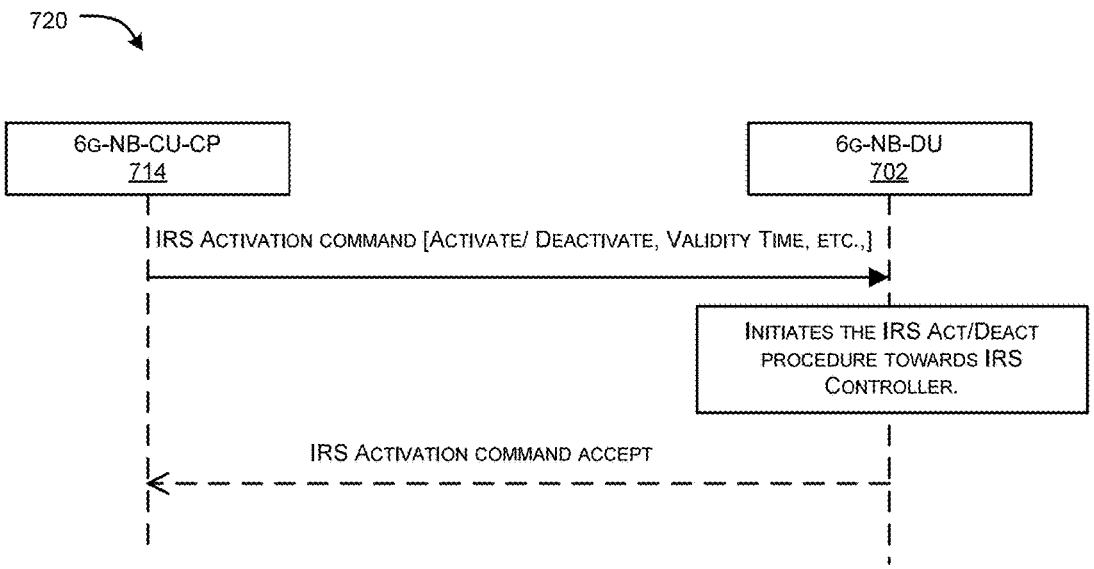

FIGS. 7e-7g illustrate initial set of procedures to support the IRS. FIG. 7e illustrates a DU Configuration Update procedure 712. This procedure is initiated by 6g-NB-DU 702 towards 6g-NB-CU-CP 714, indicating the latest set of IRS deployed and their details. In an embodiment, the 6g-NB-CU-CP 714 creates entries for those IRSs which are new and allocates a unique IRS ID for each and updates the details of other IRSs, which are already existing in the IRS-Cell mapping table. The 6g-NB-CU-CP 714 responds with DU Configuration update confirm with the list of newly allocated IRS-IDs associated with newly established IRS. The 6g-NB-DU 702 updates its table with IDs and the status of the respective IRSs will be set to active.

FIG. 7f illustrates IRS Proximity Indication procedure 716. This procedure 716 is initiated by 6g-NB-CU-CP 714 towards 6g-NB-DU 702, whenever one or more UEs (e.g., 718) are detected in the proximity of the specific IRS coverages, indicating to initiate the coordination with specific IRS, w.r.t to those UEs. The 6g-NB-DU 702 receives IRS proximity indication along with the list of UEs associated with the list of IRSs, reserved IRS resources etc. The 6g-NB-DU 702, after receiving the IRS Proximity Indication message, updates its table with the list of UEs according to the mapping with respective IRSs. The 6g-NB-DU 702 further initiates requesting those UEs (e.g., 718) to send its location information along with the Channel Status Information (CSI). A scheduler module in the 6g-NB-DU 702 starts using the reserved IRS sources for its usage towards specific set of UEs (e.g., 718).

FIG. 7g illustrates an IRS Activation Command procedure 720. This procedure is initiated by the 6g-NB-CU-CP 714 towards 6g-NB-DU 702, to activate or deactivate the IRS. As shown, the 6g-NB-CU-CP 714 sends an IRS activation command [activate/deactivate, validity time, etc.,] to the 6g-NB-DU 702. The 6g-NB-DU 702 initiates the IRS activation/deactivation procedure towards IRS controller as described earlier. The 6g-NB-DU 702 sends IRS activation command accept message to the 6g-NB-CU-CP 714. This procedure predominantly may be used during the energy saving scenarios and also during maintenance scenarios.

In an embodiment, the initial set of procedures to support IRS is performed by 6g-NB-CU-CP using Radio Resource Control (RRC) connection reconfiguration. The RRC connection reconfiguration procedure is used by 6g-NB-CU-CP to configure the measurement control to add a location information of the UE in one or more measurement reports. After receiving this request, the UE starts adding its location information in all subsequent measurement reports. In an alternate embodiment, in line with earlier proximity indication procedures, the UE when it detects it is close to or entering the IRS coverage area, it can start adding the location information either through measurement reports or using proximity indication message.

The present disclosure relates to a system and method to implement Intelligent Reflecting Surfaces (IRS) in 5G and beyond networks. The system may include a network device including one or more processors that may cause the system to establish a network interface protocol with the IRS. In an embodiment, a DU-I interface is established between the network device and the IRS using which various setup procedures can be executed. Using the proposed network interface, the network device may enable setting up of IRS that is available for reflecting signals to one or more UEs in a particular region or area. A mapping of one or more parameters of the IRS to a mechanical or digital tilt for optimal performance is predetermined and stored at the network device. The network device receives one or more measurement reports from the one or more UEs to determine, in run-time, the optimal mechanical or digital tilt based at least in part on the predetermined mapping. The network device sends the optimal mechanical or digital tilt information using the proposed network interface to the IRS and an IRS controller uses the optimal tilt information to re-align its panels or tiles.

Embodiments of a non-transitory computer readable medium (CRM) are disclosed. The CRM includes one or more instructions stored thereupon that when executed by a processor causes the process to perform a set of steps. For example, the execution of the set of instructions causes the processor to compute IRS tilt information associated with the one or more IRSs based at least in part on a first set of information received from the one or more UEs and communicate the computed IRS tilt information to the one or more IRSs via a network interface, wherein the IRS tilt information is used to control one or more operational aspects of the one or more IRSs. In an embodiment, the first set of information includes one or more of signal-to-noise-plus-interference ratio (SINR) information, Reference Signal Received Power (RSRP) information, Reference Signal Received Quality (RSRQ) information, location and channel quality indicator (CQI) information.

Figure 8A:
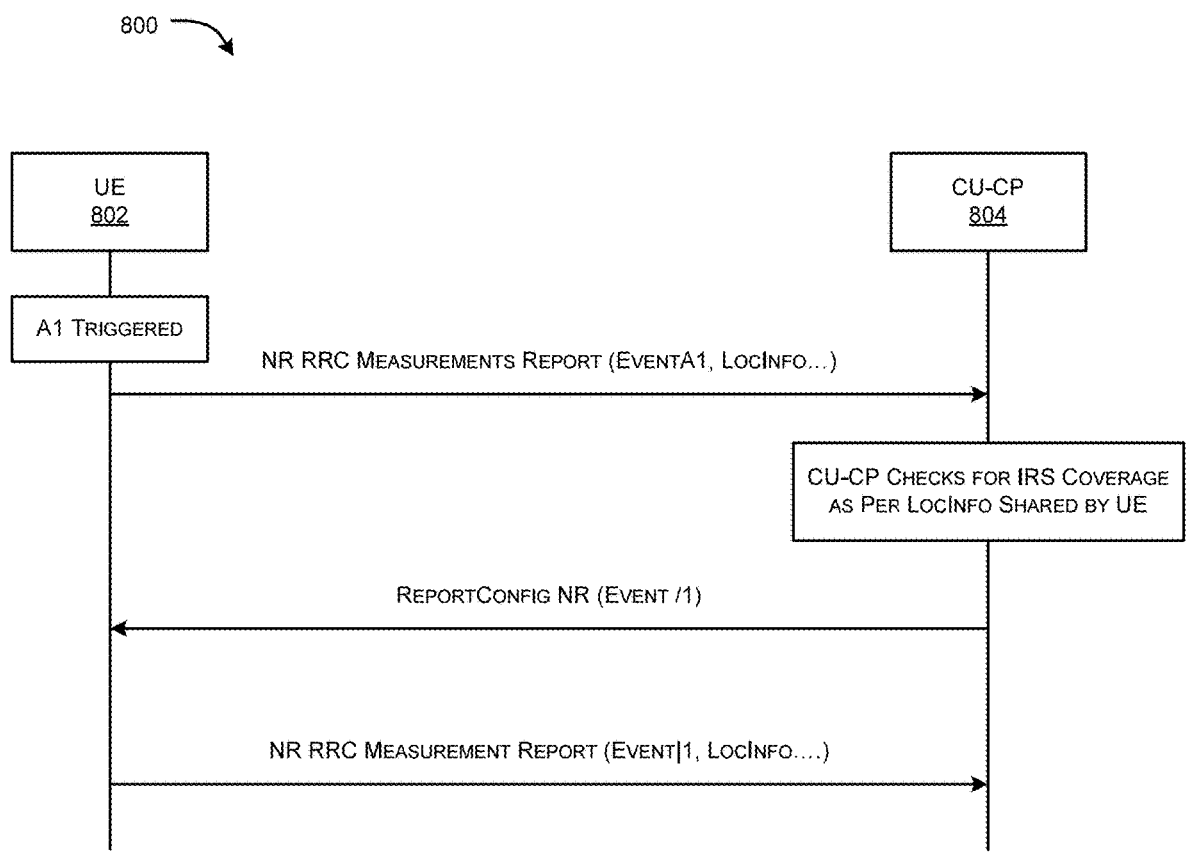
FIGS. 8a-8c illustrate the exemplary steps involved in the UE procedures for identification of IRS, measurement of signal parameters, and communication of measurement reports to the 5G or 6G network respectively, in accordance with an embodiment of the present disclosure.
Figure 8B:
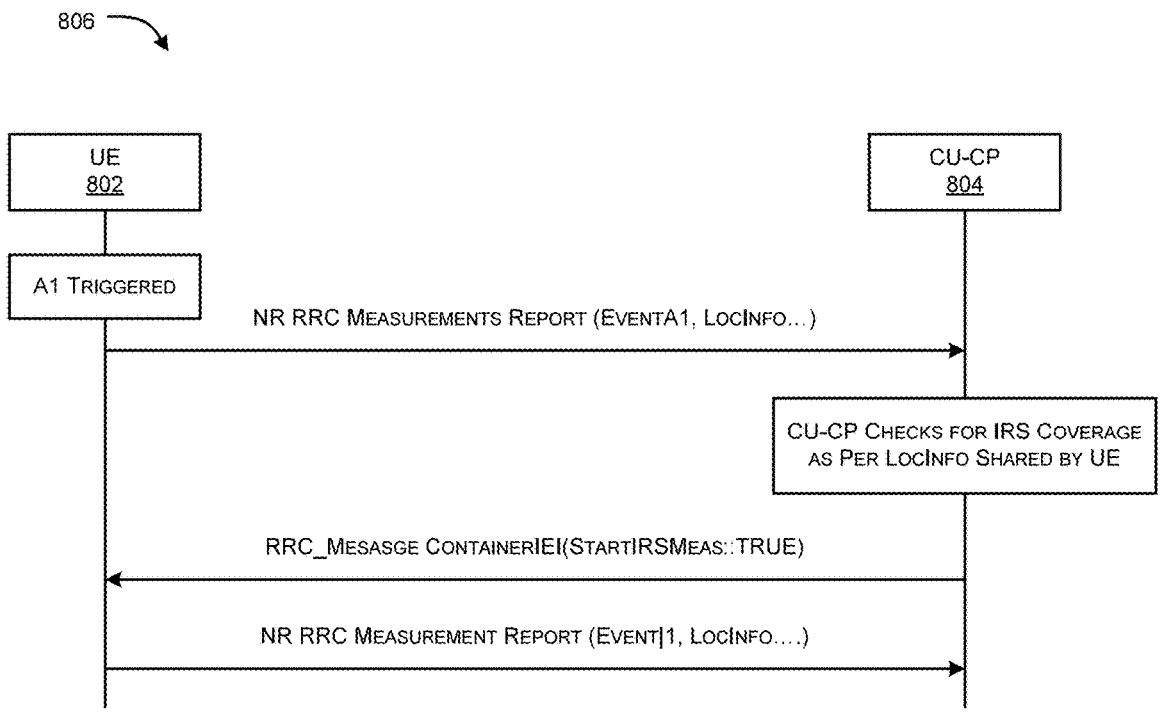
Figure 8C:
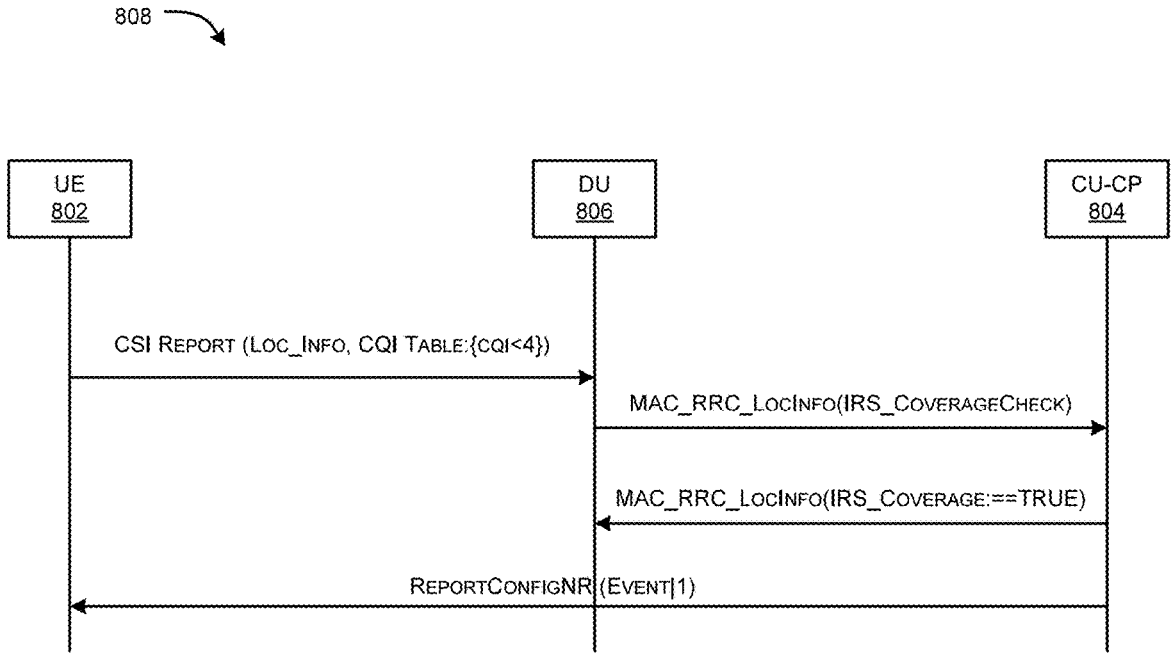

FIG. 8a-8c illustrates a set of UE procedures for supporting IRS architecture as disclosed herein. In an embodiment, a handover mechanism is disclosed for a B5G (beyond 5G—i.e., 5G/6G networks) network—wherein an IRS controller is also a part of the network architecture as explained above. Such a network needs to collect one or more measurement reports that include the RF report indicating the raw power as perceived by the UE in the form of Reference Signal Received Power (RSRP), Reference Signal Received Quality (RSRQ), SINR and the channel quality indicator (CQI) or channel state information (CSI) report to indicate the channel quality of the serving cell.

The one or more measurement reports collected by the BS (or network device) assists the network to take appropriate calls to handover a given UE (e.g., UE 544) to another cell or to another IRS controller in the same cell coverage (i.e., cell edge scenario). The disclosure contemplates various scenarios to illustrate the approach as shown in FIGS. 8a-8c.

For instance, a UE1 is in mobility and is connected to 6G-NB-DU-1 (i.e., Cell 1) and is in connected/active state. UE1 starts to move away from the coverage of the 6G-NB-DU-1 (Cell 1) and now is in the vicinity of IRS-1 coverage. In such a case, UE1 needs to be handed over to IRS-1 controller for further data transmission/reception. In an embodiment, following data points and flow of action need to be considered in the below mentioned order—

1. UE to be configured with the trigger points for UE to look for pilot signals from IRS controller (e.g., corresponding to IRS-1) and then start measurement.
2. Identification of the signal/data as reflected by IRS controller using an IRS ID.
3. IRS ID needs to be sent over the SIB1 part of the pilot signal.
4. UE to measure the CQI/CSI of the serving cell and RSRP/RSRQ of the signal as received by IRS.
5. UE to send the measurement report based on the trigger events configured and/or periodic timer.
6. Handover procedure to be completed based on the criteria set at the network side.

In an embodiment, the UE 544 is configured with one or more trigger points for UE to look for pilot signals from an IRS controller (e.g., 704) and then start corresponding measurements. Accordingly, the UE may be configured with event-based trigger for measurement (in case IRS is available in the same cell edge case and available for handover) or even periodic timer based trigger. In an exemplary embodiment, one or more example events can be configured to trigger the IRS measurement. Such example events include Event I1—when serving cell RSRP/RSRQ goes below a certain threshold that was pre-configured. Another example event can be Event I2—when Serving Cell CQI index in CSI report falls below a threshold or leads to use of QPSK. Yet another example event can be Event I3—when neighbour cell provides better signal strength than the serving cell.

In an embodiment, such example Events (i.e., I1 to I3) may be triggered based on the IRS availability in a given cell with a given approximate coverage. In another embodiment, a new mechanism is proposed to identify if a regular event A1 needs to be triggered or pre-configured event I1 needs to be triggered.

FIG. 8a illustrates a UE procedure for supporting IRS in accordance with an embodiment. In one case, the UE 802-1 shares and verifies the availability of a given IRS. When event A1 or other events (Ax) are triggered, the UE 802-1 shares the location information along with the accuracy level with the Network (CU-CP 804) as a part of the RRC message container IEI.

The CU-CP 804 confirms on the presence of IRS availability and configures event I1 or sends a new RRC message (i.e., StartIRSMeas_IE) as an RRC container and then configures IRS controller to start reflecting a pilot signal with DLCCH configured for SIB1 so that UE can detect IRS ID and as well prepare a measurement report (MR). Next, the UE 802 measures RF and confirms if the event (e.g., I1) is still valid and thus an event Ix shall be triggered. In case the UE 802-1 does not support GPS, then the UE shares the location information using C-Plane or U-Plane (SUPL) methods and measurements based on CellID, eCellID, OTDOA etc.

FIG. 8b illustrates a UE procedure for RRC measurement report in accordance with an embodiment. For example, when event A1 is triggered, the UE 802-1 sends a measurement report along with the location information. The network device identifies that the UE 802-1 is in an IRS coverage area and configures event I1 or sends a new RRC message (StartIRSMeas_IE) as an RRC container and then configures IRS controller to start reflecting a pilot signal with DLCCH configured for SIB1 so that UE 802-1 can detect IRS ID and as well prepare a MR. The RRC_MessageContainer IE can correspond to {{StartIRMeas_IE: BOOLEAN{ }}}. Similarly, MR (Measurement Report) can be sent by the UE 802-1 based on a configuration that can also be performed based on a periodic timer configured for the given UE. The procedure includes identification of the signal/data as reflected by IRS controller using an IRS ID. Like Cell ID, IRS can be identified using an IRS ID that shall be broadcasted part of the pilot signal/SIB1. A part of SIB1-CellAccessRelatedInfo is obtained which contains PLMN-IdentityInfo. This IE contains the CellIdentity of a given Cell. Therefore, same IEI shall be used to convey the IRS ID of the IRS controller. This becomes the IRS identifier for further processing at UE level. This IRS ID can be sent in place of Cell ID or can be sent along with the Cell ID as per the mapping table that exists at DU/CU related to the IRS ID and Cell ID.

In an embodiment, with reference to FIG. 8c, the IRS ID needs to be sent over the SIB1 part of the pilot signal. Assuming the IRS controller will have enough computational power, there can be two possible ways of encoding the IRS ID into the SIB1 sent over the pilot signal.

In a first alternate, the IRS ID is pre-coded in the SIB1 signal at the CU-CP side (RRC) when it is pre-decided to send this to UE 802 via IRS reflector. This way IRS can merely reflect the signal based on the configuration received earlier.

In a second alternative, the IRS ID is encoded and inserted into the SIB1 message after decoding it when received from the CU-DU (gNodeB) and then send it to the UE 802 directed by its IRS reflector as per the configuration received. In an embodiment, UE measures the CQI/CSI of the serving cell and RSRP/RSRQ of the signal as received by IRS. Once UE detects that an event is triggered, or a timer is expired it will start sniffing for a pilot signal from an IRS reflector and IRS ID is detected after reading the SIB1. Once the IRS ID is known and measurement of the raw power is done, the UE 802 makes it part of Measurement report that is sent to either RRC in CU-CP and/or the other MAC scheduler in the DU—part of the CSI report.

CSI to MAC Scheduler—When MAC scheduler in the DU receives the CSI report and identifies to reduce the modulation scheme to QPSK, then based on the location information made available part of the CSI report which maps to the availability of the IRS coverage, then it indicates RRC for a handover of UE to IRS. If location information is not available with the UE 802, then MAC scheduler in DU can connect to RRC over DU-CU interface to get UE location information and see if it is under IRS coverage and if response is YES, then RRC can trigger handover.

In an embodiment, UE is configured to send the measurement report based on the trigger events configured and/or periodic timer & handover procedure to be completed based on the criteria set at the network side. In an embodiment, measurement report can be of 2 types—NR Measurement report to RRC in CU-CP based on the configuration received and CSI report on the serving cell to MAC scheduler.

Based on the CSI report wherein the CQI index drops to less than a configured threshold i.e., to the index reflecting the usage of QPSK and to maintain a TP, gNodeB needs to allocate more PRBs. In such a case when gNodeB is aware that UE is in the vicinity of the IRS, it starts reflecting the pilot signal with pre-coded SIB1. Now, UE measures the IRS raw power as perceived by the UE and records it in NR Measurement report. Based on the Measurement report Handover to IRS is trigger by the CU-CP→DU.

Similarly, MR can be sent by UE based on a configuration that can also be done based on a periodic timer configured for the given UE. The IE's can be modified to reflect the above-mentioned configurations for new event triggers.

Figure 9:
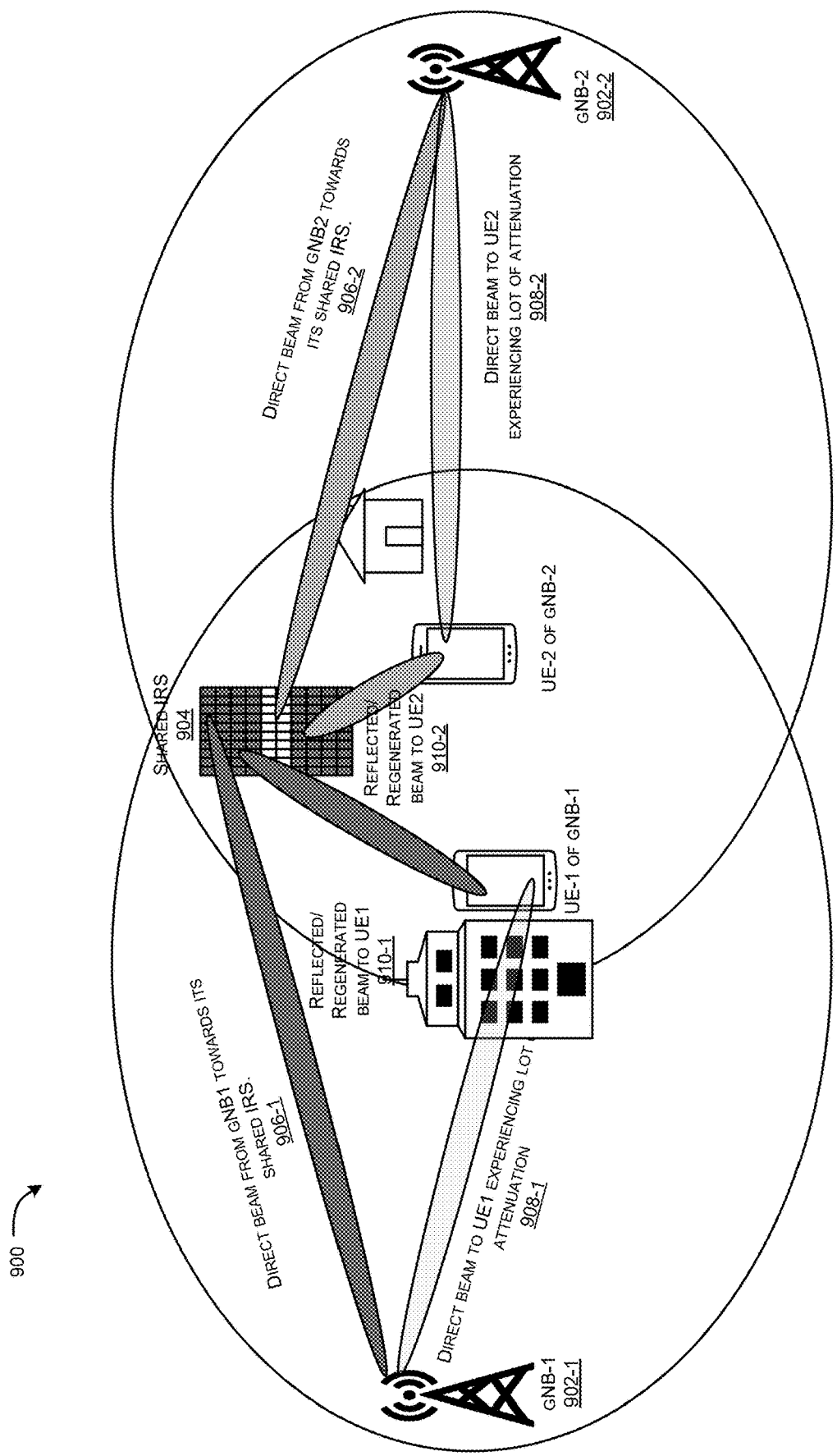
FIG. 9 illustrates an exemplary scenario of IRS network architecture that provides sharing of IRS between multiple network devices in accordance with an embodiment of the present disclosure.

FIG. 9 illustrates an exemplary IRS sharing scenario 900, where a single IRS 904 can be shared by one or more cells in a 5G/6G network. In an embodiment, different portions of IRS can be reserved by different base stations (e.g., 902-1, 902-2) having an overlapping network coverage. The IRS 904 would lie in the common overlapping region with respect to a plurality of base stations. Due to intelligent systems and methods implemented in the IRS 904, the different portions of IRS 904 can be reserved or utilized to bounce or regenerate respective signals from the BSs towards respective UEs being serviced by the BSs. This mechanism has an advantage of optimal utilization and deployment of IRS resources of the same IRS without compromising on service quality. As described above, the proposed DU I/F allows the BSs (902-1 and 902-2) to set-up and configure the IRS 904 in 5G networks and beyond networks (6G networks).

In an exemplary embodiment, the IRS controller of the IRS 904 enables different BSs to configure a portion of the IRS 904 while maintaining exclusivity without interference to the other portions. In an embodiment, various identification mechanisms to uniquely identity the one or more portions may be implemented by the IRS controller to uniquely identify and address the one or more portions. Also, a mapping between the various portions and corresponding BSs may be stored either locally in the IRS 904 or may be stored in a central location accessible to the participating BSs. In an embodiment, there may be a limitation of the maximum number of BSs that can share a given IRS depending on parameters such as, but not limited to, the dimensions of the IRS 904, isolation of the different portions from one another, hardware/software requirements for individual control of each portion, and so on. In an embodiment, the portions of the IRS 904 utilized by a first BS (e.g., 902-1) may be released for further re-configuration for use by a second BS (e.g., 902-2) after a predetermined time period or based on usage pattern of the reserved portion. Such reconfiguration may happen while another portion of the IRS 904 is still being utilized by a third BS. The re-configuration of the portions of the IRS by the BS will follow the same procedure as the configuration procedure described herein.

In an exemplary embodiment, the IRS microcontroller intelligently maintains a mapping of different portions to different BSs. Such mapping may be stored either locally in the IRS or may be shared with participating BSs either on request or as part of the initial discovery/set-up procedure of the IRS. To this end, the BS may request or query the IRS for availability of resources (i.e., IRS portions) as per the signal strength and directional requirement in the context of a particular UE that needs to be served by the BS. In an embodiment, the sharing of portions of the IRS is based on a one-time configuration set-up procedure at the time of deployment and the portions are not released or re-configured later.

With reference to the FIG. 9, UE1 is connected to cell of gNB1 (902-1) and UE2 is connected to cell of gNB2 (902-2), where they are experiencing a degradation of the direct signals from the respective cells. Since these two UEs are under the coverage of the same IRS controller (corresponding to IRS 904), the resources of the IRS 904 can be shared cither statically or dynamically with both the cells. When the UE1 and UE2 report their location information to the respective gNB-CU-CPs, the gNB-CU-CPs will check its respective IRS-cell mapping table, where it finds that same IRS coverage is applicable for both the cells. Therefore, the gNB-CU-CP may decide to share the common IRS resources between these two cells. In an embodiment, the gNB-CU-CP may use the internal AI/ML strategy and decides to reserve 'X %' of IRS antenna resource elements to cell1 and 'Y %' of IRS antenna resource elements to cell2. This reservation of IRS antenna element resources will be communicated to the respective gNB-DUs via 6G-F1 interface procedures. In an embodiment, the gNB-DU will additionally request the UEs to report the location information along with CSI information and dynamically takes the decision whether to use IRS 904 to enhance the UE experience.

Once the UE moves out of IRS coverage area, gNB-CU-CP will release the reserved IRS resources and intimate the same to the respective gNB-DUs, to plan its future scheduling accordingly. As shown in the figure, gNB1 (902-1) sends a direct beam 906-1 towards its shared IRS resource in IRS 904 and gNB2 (902-2) sends a direct beam 906-2 towards its shared IRS resource in IRS 904. Further, gNB1 (902-1) sends a direct beam 908-1 towards UE1 and gNB2 (902-2) sends a direct beam 908-2 towards UE2 where both UE1 and UE2 are experiencing attenuated (direct) signals. Further, the corresponding reflected/regenerated beam 910-1 is directed towards the UE1 and the corresponding reflected/regenerated beam 910-2 is directed towards the UE2.

Figure 10:
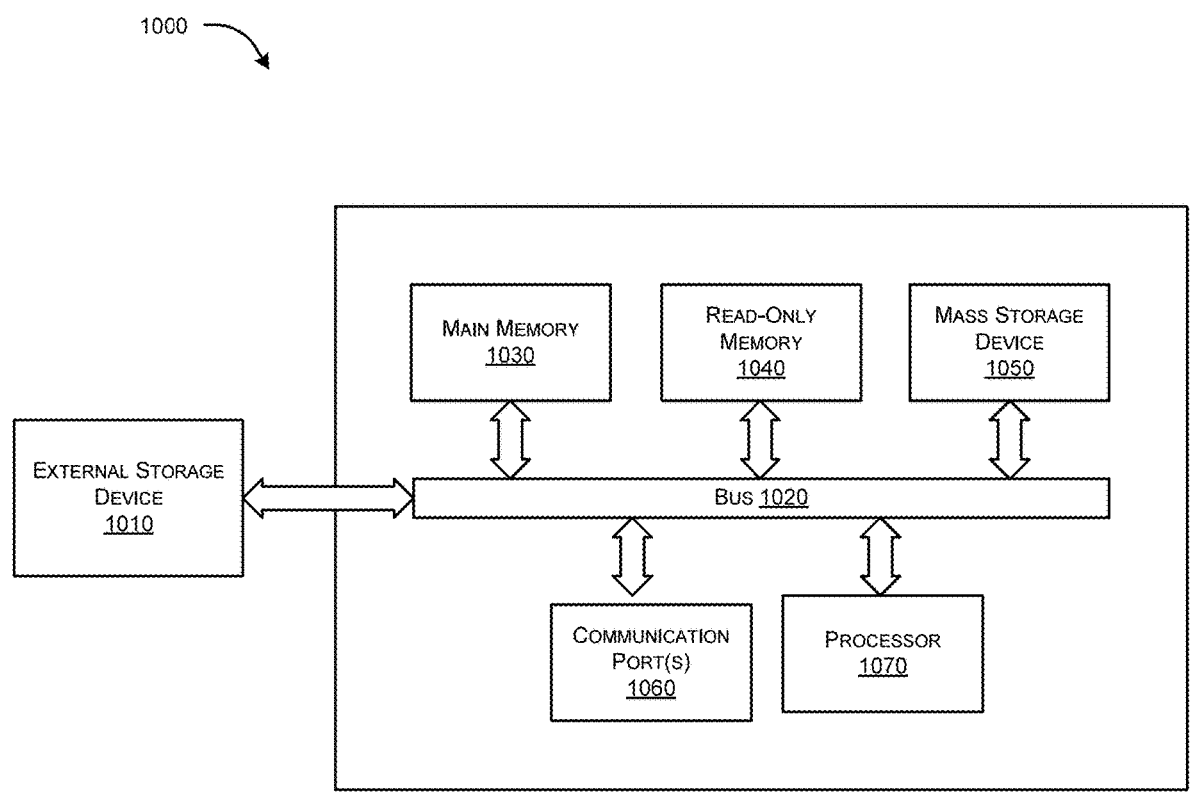
FIG. 10 illustrates an exemplary computer system in which or with which embodiments of the present invention can be utilized in accordance with embodiments of the present disclosure.

FIG. 10 illustrates an exemplary computer system in which or with which embodiments of the present invention can be utilized in accordance with embodiments of the present disclosure. As shown in FIG. 10, computer system 1000 can include an external storage device 1010, a bus 1020, a main memory 1030, a read only memory 1040, a mass storage device 1050, communication port 1060, and a processor 1070. A person skilled in the art will appreciate that the computer system may include more than one processor and communication ports. Processor 1070 may include various modules associated with embodiments of the present invention. Communication port 1060 can be any of an RS-232 port for use with a modem based dialup connection, a 10/100 Ethernet port, a Gigabit or 10 Gigabit port using copper or fibre, a serial port, a parallel port, or other existing or future ports. Communication port 1060 may be chosen depending on a network, such a Local Area Network (LAN), Wide Area Network (WAN), or any network to which computer system connects. Memory 1030 can be Random Access Memory (RAM), or any other dynamic storage device commonly known in the art. Read-only memory 1040 can be any static storage device(s) e.g., but not limited to, a Programmable Read Only Memory (PROM) chips for storing static information e.g., start-up or BIOS instructions for processor 1070. Mass storage 1050 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces) one or more optical discs, Redundant Array of Independent Disks (RAID) storage, e.g. an array of disks (e.g., SATA arrays).

Bus 1020 communicatively couples processor(s) 1070 with the other memory, storage, and communication blocks. Bus 1020 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1070 to software system.

Optionally, operator and administrative interfaces, e.g., a display, keyboard, and a cursor control device, may also be coupled to bus 1020 to support direct operator interaction with a computer system. Other operator and administrative interfaces can be provided through network connections connected through communication port 1060. Components described above are meant only to exemplify various possibilities. In no way should the aforementioned exemplary computer system limit the scope of the present disclosure.

Figure 11:
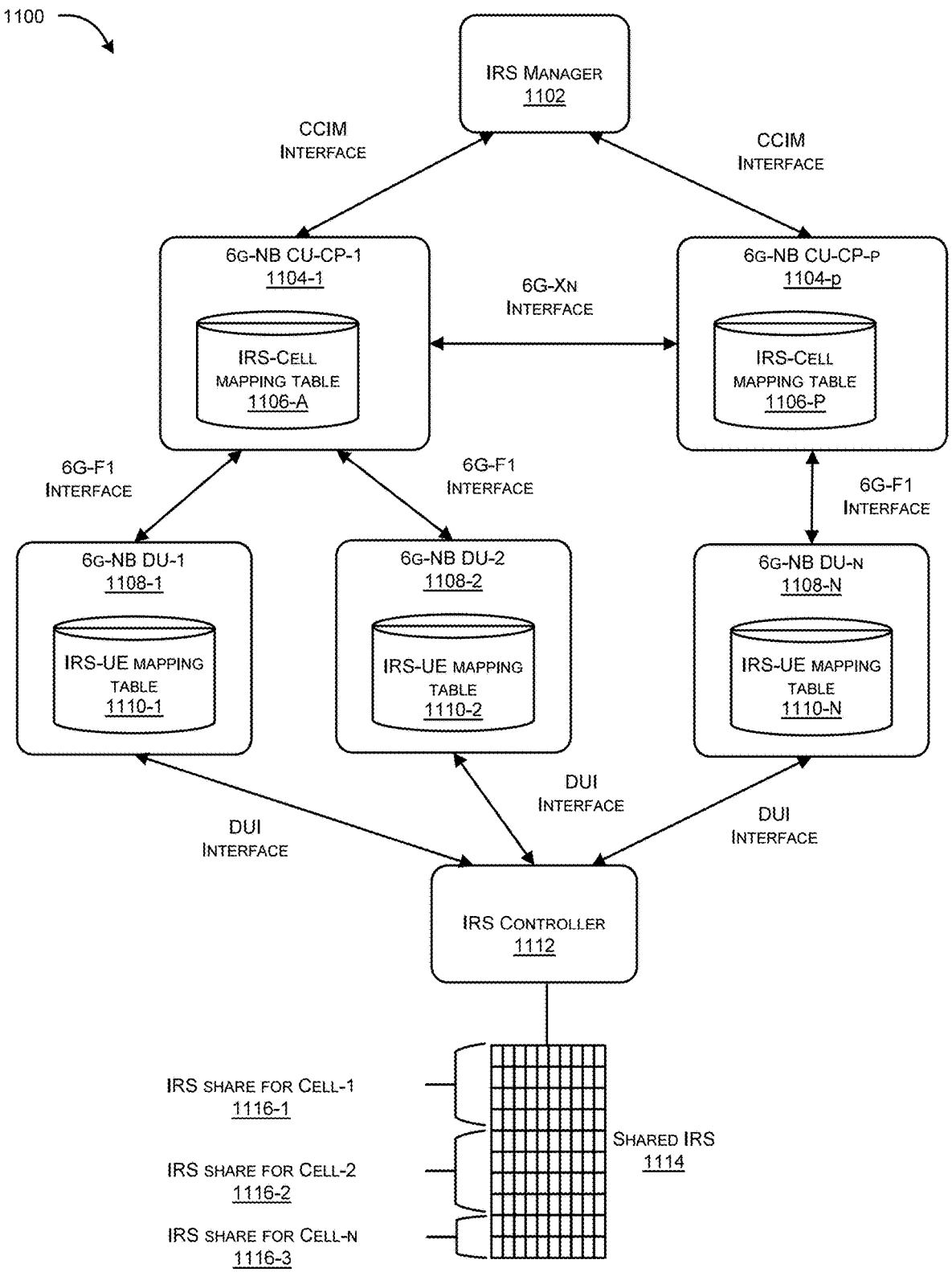
FIG. 11 illustrates an exemplary RAN architecture 1100, where the IRS Manager is placed as centralized standalone entity, which communicates with the gNB-CU-CP via the CCIM interface [CCIM: CU-CP-IRS Manager] in accordance with an embodiment of the present disclosure.

FIG. 11 illustrates an exemplary RAN architecture 1100, where the IRS Manager 1102 is placed as a centralized standalone entity, which communicates with the gNB-CU-CP via the CCIM interface [CCIM: CU-CP-IRS Manager] in accordance with an embodiment. Here, the IRS Manager 1102 uses the CCIM Interface to collect the UE Measurements reports, Location information, Scheduling data, etc. from the gNB-CU-CP (e.g., 1104-1, 1104-p). In addition, the IRS Manager 1102 uses the CCIM Interface to share the decisions on the shared IRS resources with gNB-CU-CPs, which in turn forwards it to gNB-DU (e.g., 1108-1, 1108-2 . . . , 1108-N) via 6G F1 interfaces. In an embodiment, the IRS Manager 1102 can handle multiple gNB-CU-CPs. As shown in FIG. 11, each of the gNB-DUs include the IRS-UE mapping table (e.g., 1110-1, 1110-2, . . . , 1110-N). Each of the IRS-UE mapping tables comprise a mapping between various UEs that are being served to the IRS resources that are being utilized for serving the UEs by the IRS. As shown, the mapping information may be shared with the IRS controller 1112 of a given IRS (say, 1114) via the DUI interface. The IRS controller 1112 accordingly configures the shared IRS 1114 to appropriately assign/allocate IRS shared resources for cell-1, cell-2, . . . , cell-N (e.g., 1116-1, 1116-2, . . . , 1116-N). It may be noted that IRS manager 1102 may be implemented as a network device having one or more processors coupled to a memory that stores a set of instructions that when executed by the one or more processors causes the IRS manager 1102 to perform the described functionalities of the IRS manager 1102. It may be noted that IRS controller 1112 may be similar to IRS controller 704 as described above.

Figure 12:
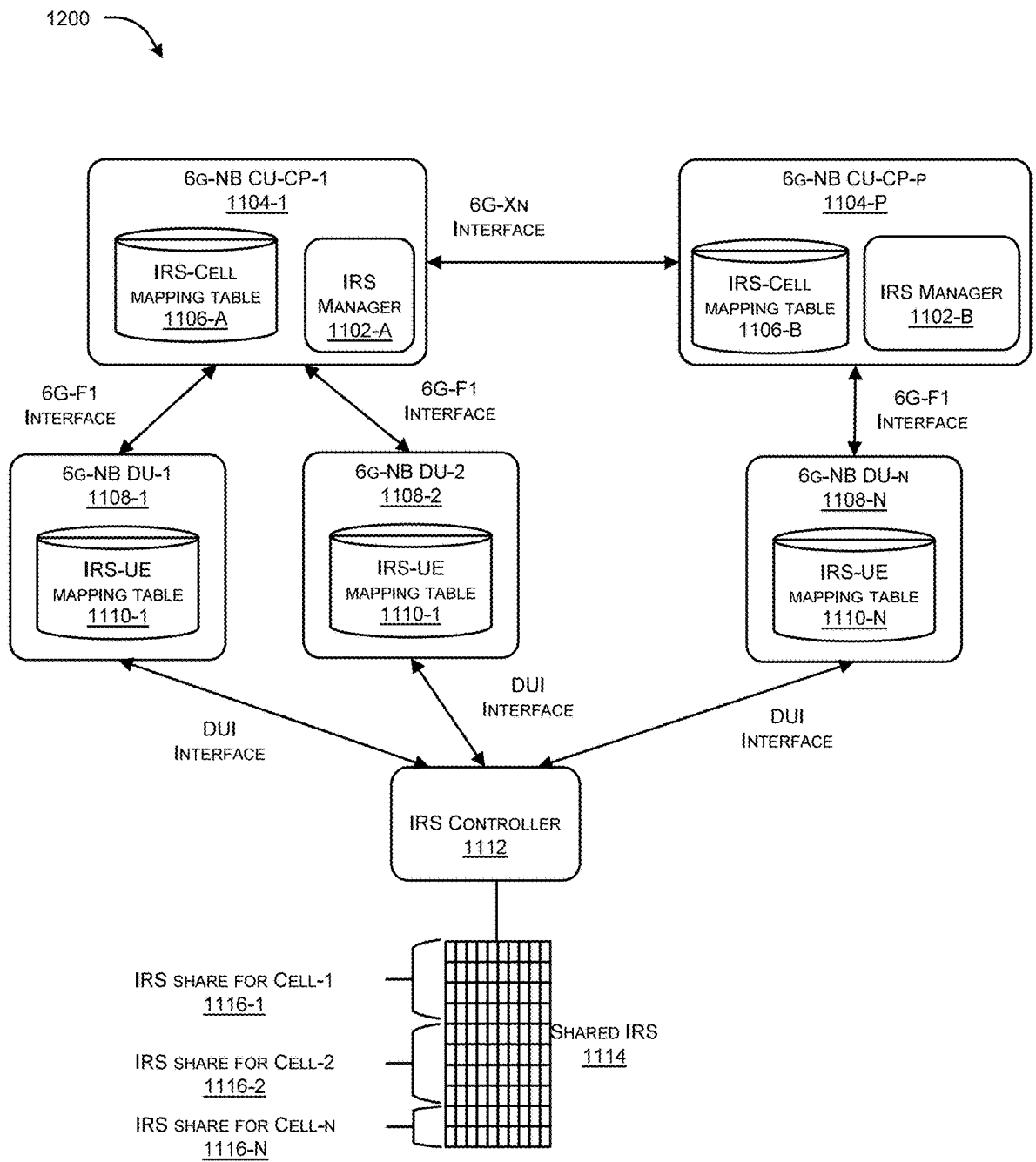
FIG. 12 illustrates an exemplary RAN architecture 1200, where the IRS Manager is placed as distributed entity, collocated with gNB-CU-CP in accordance with an embodiment of the present disclosure.

FIG. 12 illustrates an exemplary RAN architecture 1200, where the IRS Manager is implemented as a distributed entity, co-located with gNB-CU-CP in accordance with an embodiment. Here, the IRS Manager (e.g., 1102-A, 1102-B) can communicate with its gNB-CU-CP (e.g., 1104-1, 1104-P) via the internal CCIM interface, which can be specific to a given implementation. In an embodiment, the IRS Manager (e.g., 1102-A) can handle only one gNB-CU-CP 1104-1), with which it is co-located. If the IRS sharing needs to be supported across multiple gNB-CU-CP, then the messages defined above needs to be defined for 6G Xn interfaces, which will be used for a given IRS Manager (e.g., 110-2A) to communicate with the peer IRS managers (e.g., 1102-B) via the Xn interface. The subsequent communication and operation follows in a similar manner as described with reference to FIG. 11 above. It may be noted by those skilled in the art that the embodiment described and shown in FIG. 12 envisages integration of IRS manager into the gNB-CU-CP (e.g., 1104-1, 1104-P) thereby making it a part of the base station or network device 524 as shown in FIG.

5B, for example. Various other implementations may be possible without departing from the scope of the ongoing description.

Figure 13:
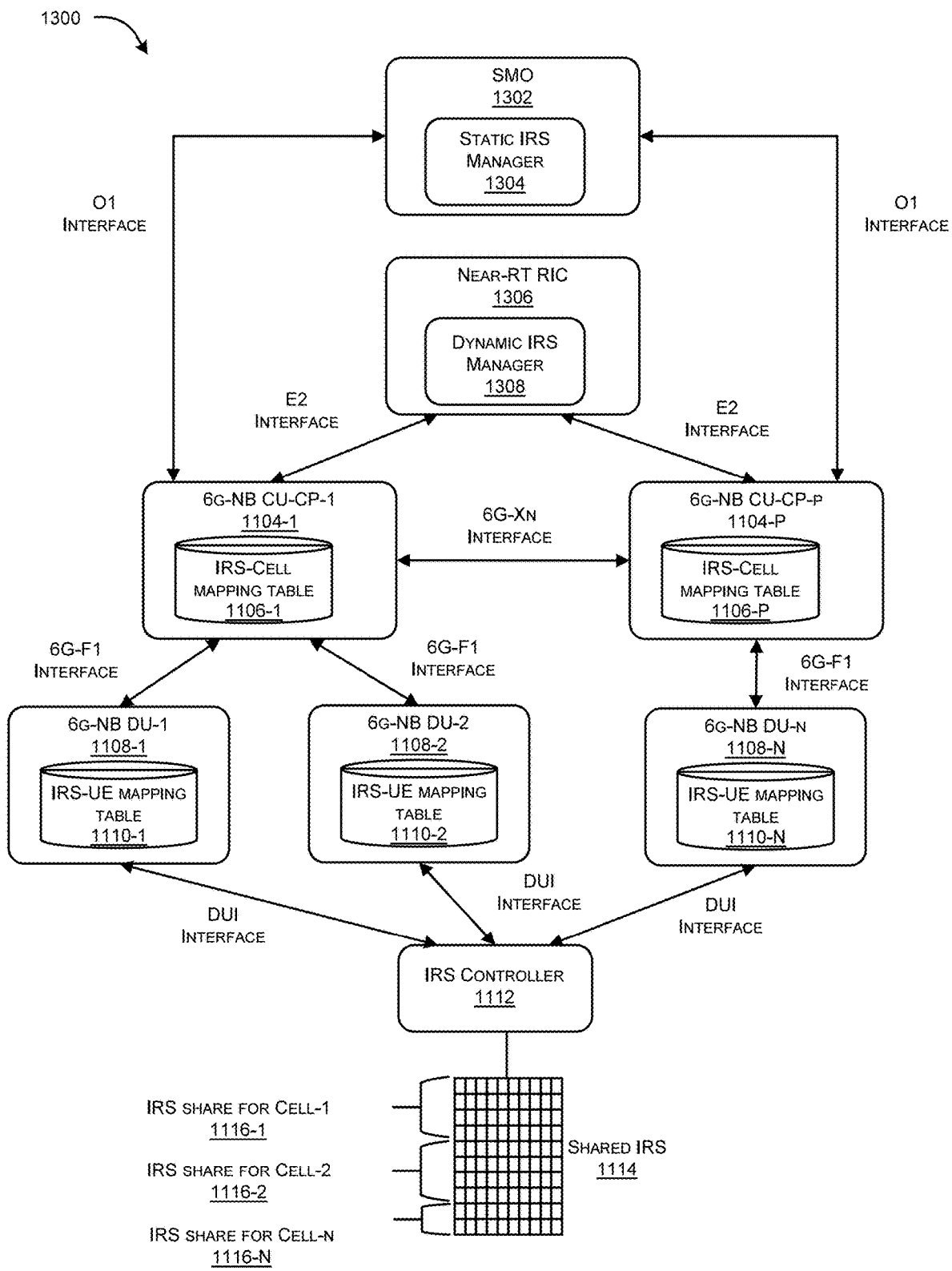
FIG. 13 illustrates an exemplary RAN architecture 1300, where the IRS Manager is placed as a centralized entity in accordance with an embodiment of the present disclosure.

FIG. 13 illustrates an exemplary RAN architecture 1300, where the IRS Manager is implemented as a centralized entity in accordance with an embodiment. In an embodiment, the IRS Manager may be implemented as a static IRS Manager 1304 and/or a dynamic IRS Manager 1308. Further, the dynamic IRS Manager 1308 is part of Near-RT RIC 1306 and is configured to handle the dynamic sharing of the IRS resources. In an embodiment, the dynamic IRS manager 1308 communicates with the gNB-CU-CP (e.g., 1104-1, 1104-P) via the respective E2 interfaces. In an embodiment, all the communication needs for the dynamic IRS manager 1308 will be included within the E2 Interfaces. Also, in an embodiment, the static IRS Manager 1304 may be implemented as part of the SMO 1302, which can handle the static sharing of the IRS resources. The communication between the static IRS manager 1304 at SMO 1302 and the gNB-CU-CP (e.g., 1104-1, 1104-P) can happen via the O1 interface as shown in the figure. The subsequent communication and operation follows in a similar manner as described with reference to FIG. 11 above. Various other implementations may be possible without departing from the scope of the ongoing description.

Figure 14:
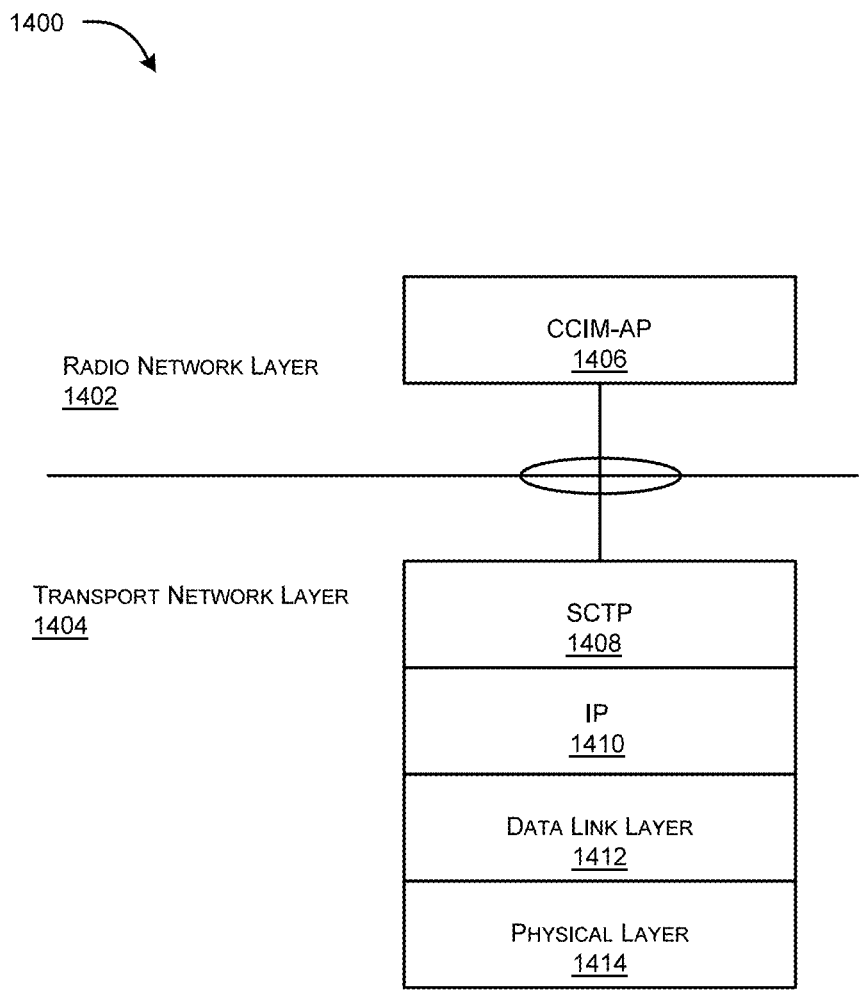
FIG. 14 illustrates an exemplary CCIM Interface protocol stack in accordance with an embodiment of the present disclosure.

FIG. 14 illustrates an exemplary Common Communications Interface Module (CCIM) Interface protocol stack in accordance with an embodiment. In an embodiment, the disclosed IRS architecture for sharing IRS resources may need a protocol stack for communication between the radio network layer 1402 and the transport network layer 1404. As shown, the radio network layer protocol 1402 includes the Common Communications Interface Module (CCIM) Application Program Interface (API) layer 1406. As shown, the transport network layer protocols include Stream Control Transmission Protocol (SCTP) layer 1408, the Internet Protocol layer 1410, the data link layer 1412, and the physical link layer 1414.

Figure 15A:
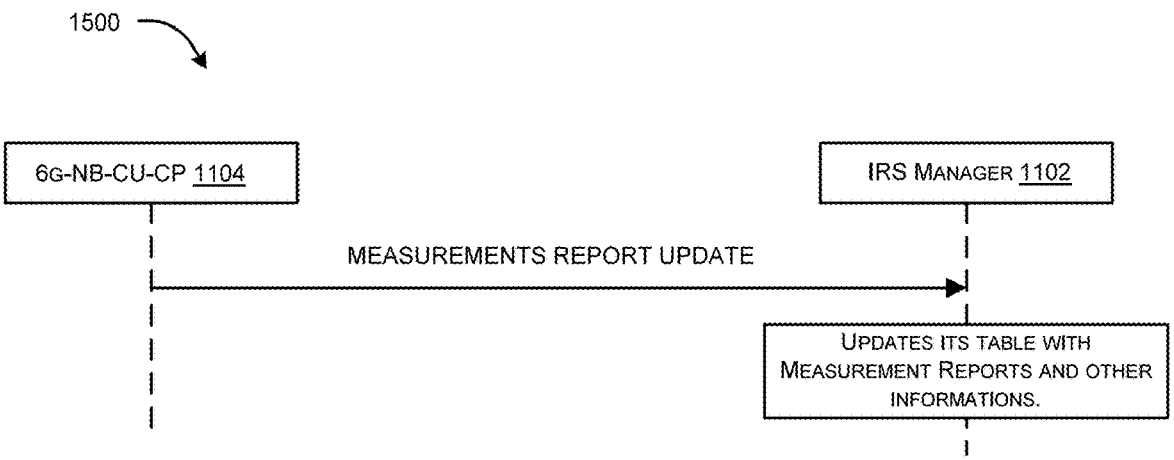
FIGS. 15a-d illustrate an exemplary initial set of procedures that may be used in the CCIM interface in accordance with an embodiment of the present disclosure.

FIGS. 15a-d illustrates an exemplary initial set of procedures that may be used in the CCIM interface in accordance with an embodiment. With reference to FIG. 15a, Measurements Reports Update procedure 1500 is illustrated. As shown, this procedure 1500 is used by gNB-CU-CP 1104 to update the UE measurements reports and share with the IRS manager (e.g., 1102). In an embodiment, the measurement report can also carry the UE location information. The Measurements Reports Update message is sent from the gNB-CU-CP to IRS Manager. In an embodiment, the message can include the list of cells being serviced, list of UEs whose SINR is bad or below a predetermined threshold, location information of such UEs, and the list of IRS IDs to which these UEs belong.

Figure 15B:
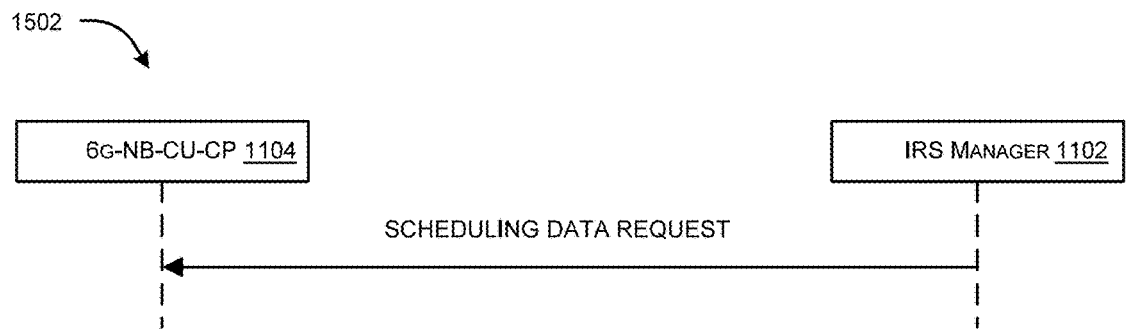

With reference to FIG. 15b, a scheduling data request procedure 1502 is illustrated. This procedure 1502 is used by the IRS Manager 1102 to request the gNB-CU-CP 1104 to share the MAC scheduler data for the list of UEs (suffering from poor signal reception). In an embodiment, the Scheduling Data Request message is transmitted from IRS Manager 1102 to the gNB-CU-CP 1104. In an embodiment, the Scheduling Data Request message can include the list of cells, list of UEs whose SINR is bad or below predetermined threshold, and Number of TTIs for which scheduling data is requested.

Figure 15C:
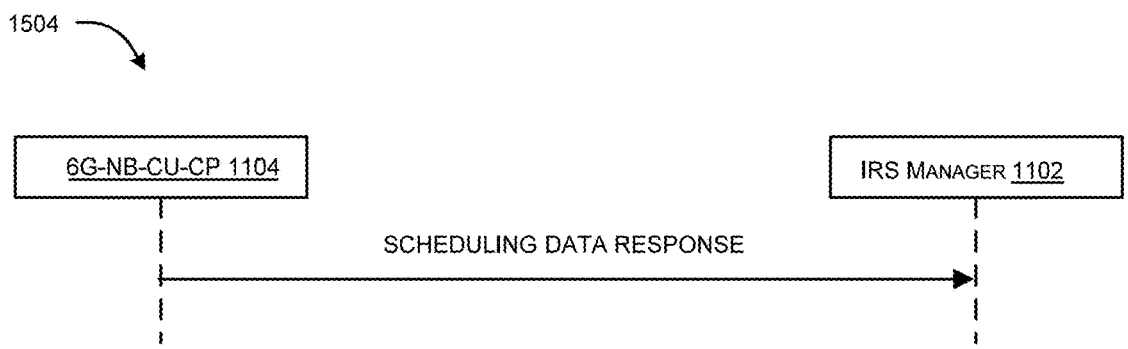

With reference to FIG. 15c, a scheduling data response procedure 1504 is illustrated. This procedure 1504 is used by the gNB-CU-CP 1104 to update the IRS manager 1102 with the MAC Scheduler data. In an embodiment, this Scheduling Data Response message is transmitted from the gNB-CU-CP 1104 to the IRS Manager 1102. In an embodiment, the message can include the List of Cells, List of UEs, Amount of data yet to be scheduled for these UEs, Balance Packet Delay Budget (PDB) for the data to be scheduled, allocated Modulation and Coding Scheme (MCS), and Received Channel Status Information (CSI) information.

Figure 15D:
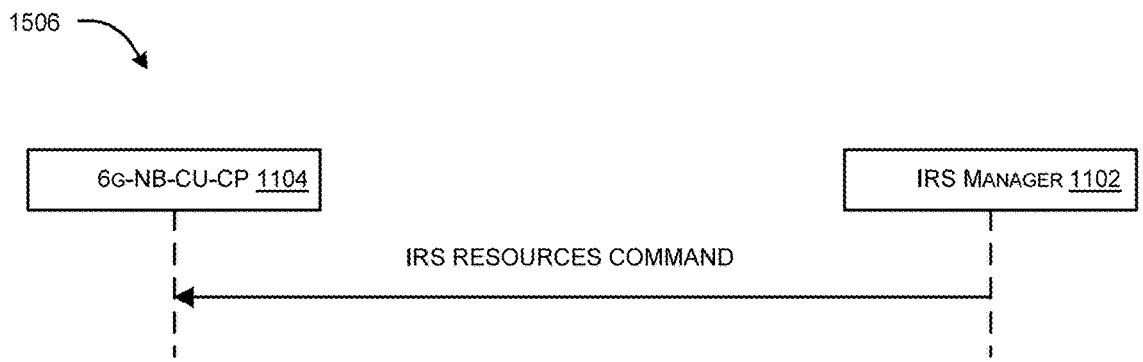

With reference to FIG. 15d, IRS Resource Command procedure 1506 is illustrated. This procedure 1506 is used by the IRS Manager 1102 to command the allocated IRS resources to the gNB-CU-CP 1104. In an embodiment, this message is sent by the IRS Manager 1102 to the gNB-CU-CP 1104. In an embodiment, the message can include the List of Cells, List of UEs, Share of IRS resources allocated for each cell, and the Validity time of the IRS resource allocation.

Figure 16A:
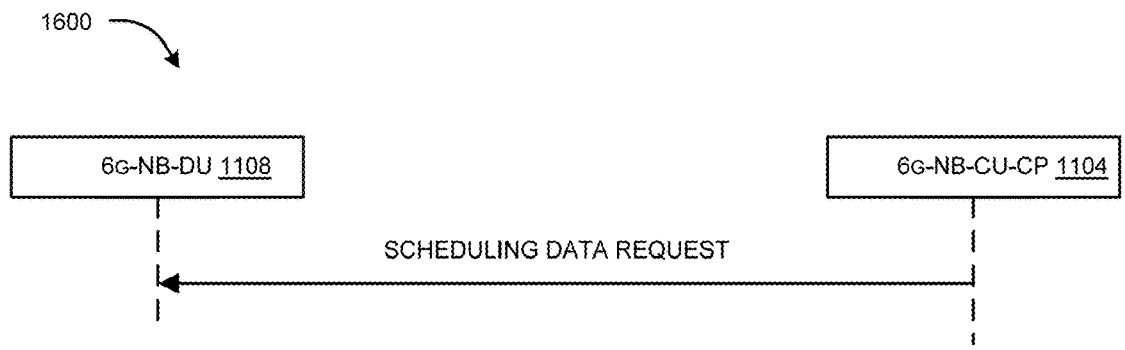
FIGS. 16a-b illustrate procedures of 6G F1 interface that needs to be supported for the IRS Sharing functionality in accordance with an embodiment of the present disclosure.
Figure 16B:
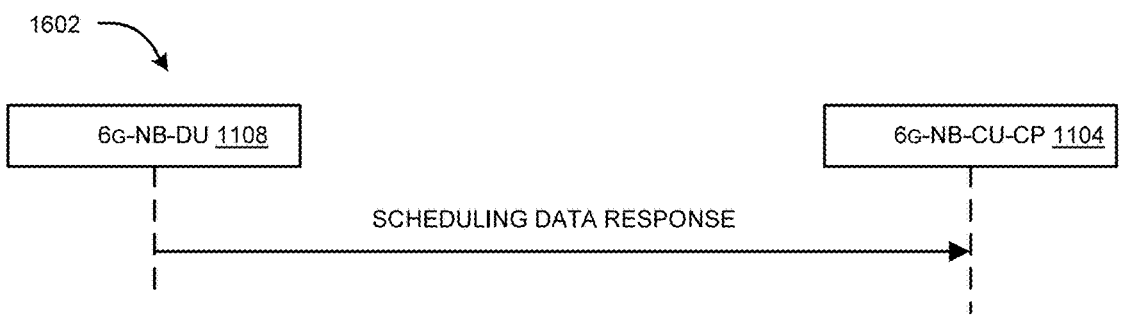

FIGS. 16a-b illustrate 6G F1 interface procedures that may be required to be supported for the IRS sharing functionality. With reference to FIG. 16a, a Scheduling data request procedure 1600 is illustrated. This procedure 1600 is used by the gNB-CU-CP 1104 to request the gNB-DU 1108 to share the MAC scheduler data for the list of suffering UEs. In an embodiment, this Scheduling Data Request message is transmitted from gNB-CU-CP 1104 to the gNB-DU 1108 and can include the list of cells, list of UEs whose SINR is bad, and Number of TTIs for which scheduling data is requested.

With reference to FIG. 16b, Scheduling data response procedure 1602 is illustrated. This procedure is used by the gNB-DU 1108 to update the gNB-CU-CP 1104 with the MAC Scheduler data. This Scheduling Data Response message is transmitted from the gNB-DU 1108 to the gNB-CU-CP 1104. In an embodiment, the message can include the List of Cells, List of UEs, Amount of data yet to be scheduled for these UEs, Balance PDB for the data to be scheduled, allocated MCS, and Received CSI information.

It may be noted that these IRS sharing related procedures may be included within the E2 interface and O1 interface, to support the IRS Manager functionality, when they are supported at Near-RT RIC and SMO respectively, as illustrated and described in the architectures above with reference to FIG. 13.

Figure 17:
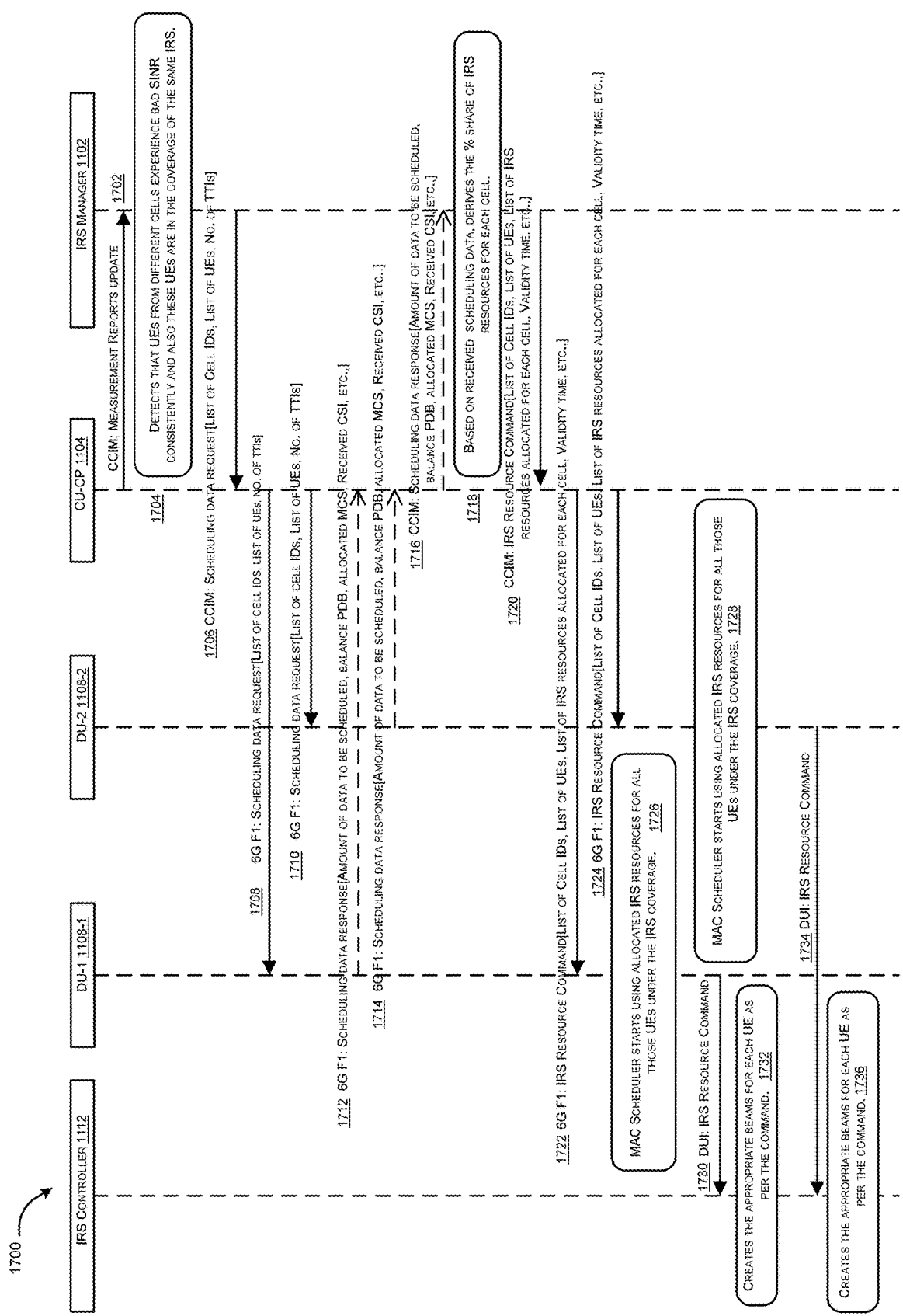
FIG. 17 illustrates an exemplary sequence of steps 1700 for IRS sharing in accordance with an embodiment of the present disclosure.

FIG. 17 illustrates an exemplary sequence of steps for a method 1700 for sharing IRS resources of an IRS in a 5G/6G communication network. In an embodiment, the method 1700 includes, at step 1702, receiving from CU-CP 1104, a CCIM measurement report update message, by the IRS manager 1102. At step 1704, the IRS Manager 1102 detects that the UEs from different cells experience bad SINR consistently and also these UEs are in the coverage of the same IRS (e.g., 904). The CCIM scheduling data request, transmitted via CCIM-API layer includes a list of cell, IDs, list of UEs, and no. of TTIs. At step 1706, a scheduling data request message is transmitted via the 6G F1 interface by the IRS Manager 1102 to the CU-CP 1104 via the CCIM-API interface. At steps 1708 and step 1710, the CU-CP 1104 transmits, via the 6G F1 interface, the scheduling data request message to DU-1 1108-1 and the DU-2 1108-2 respectively. At steps 1712 and 1714, the DU-1 1108-1 and DU-2 1108-2 transmit, via the 6G F1 interface, a scheduling data response message that comprises amount of data to be scheduled, balance PDB, allocated MCS and received CSI respectively to the CU-CP 1104. At step 1716, the CU-CP 1104 transmits the scheduling data response CCIM message via the CCIM-API interface to the IRS Manager 1102. At step 1718, the IRS Manager 1102, based on the received scheduling data, derives the determined share of IRS resources for each cell being served. At step 1720, the IRS Manager 1102 sends via the CCIM API interface, IRS resource command that comprises a list of cell IDs, list of UEs, list of IRS resources allocated for each cell and the validity time. At steps 1722 and 1724, the CU-CP 1104, via the 6G F1 interface sends the IRS resource command that comprises a list of cell IDs, list of UEs, list of IRS resources allocated for each cell and the validity time to DU-1 1108-1 and DU-2 1108-2 respectively. At steps 1726 and 1728, the MAC schedulers of DU-1 1108-1 and DU-2 1108-2 start using allocated IRS resources for all those UEs under the IRS coverage respectively. At steps 1730 and 1734, the DU-1 1108-1 and DU-2 1108-2 send respective IRS resource commands to the IRS controller 1112. At steps 1732 and 1734, the IRS controller 1112 creates the appropriate beams for each UE as per the IRS resource commands received in steps 1730 and 1734 respectively.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides an effective, concurrent, and improved communication within next generation networks (e.g., 6G) by utilizing IRS architectures.

The present disclosure provides a system and a method to eliminate the need for expensive deployment of base stations for improved coverage in areas having one or more obstacles.

The present disclosure provides an economical and next generation based system and method that can avoid problems faced by UEs due to poor signal, signal degradation and lack of coverage.

The present disclosure provides an effective system and method that can enable seamless service quality irrespective of the location of the user.

The present disclosure provides a system and a method for sharing IRS resources of an IRS amongst a plurality of base stations to service one or more cells.

We claim:

1. A network device for sharing Intelligent Reflecting Surface (IRS) resources of an Intelligent Reflecting Surface (IRS) in a communication network, the network device comprising:
   one or more processors coupled to a memory storing a set of instructions which when executed by the one or more processors cause the network device to:
   receive, from an IRS manager, a scheduling data request, wherein the IRS manager transmits the scheduling data request upon determination of poor signal reception by a plurality of User Equipments (UEs) based at least in part on a measurement report received from the network device corresponding to each of the plurality of UEs;
   transmit, to the IRS manager, responsive to the received scheduling data request, a scheduling data response;
   receive, from the IRS manager, an IRS resource command, wherein the IRS manager transmits the IRS resource command responsive to the scheduling data response; and
   transmit, to an IRS controller associated with the IRS, the received IRS resource command, wherein IRS controller is configured to allocate the IRS resources to each of the plurality of UEs based on the IRS resource command.

2. The network device as claimed in claim 1, wherein the IRS manager transmits the scheduling data request upon determination of presence of the plurality of UEs in the coverage of the IRS.

3. The network device as claimed in claim 1, wherein the measurement report comprises a Channel Quality Indicator (CQI) and Channel State Information (CSI) parameter of a serving cell, and Reference Signal Received Power (RSRP) information, and a Reference Signal Received Quality (RSRQ) parameter of a pilot signal as received from the IRS by each of the plurality of UEs.

4. The network device as claimed in claim 1, wherein the processor is configured to communicate with the IRS manager via a Common Communications Interface Module (CCIM) Interface.

5. The network device as claimed in claim 1, wherein the processor is configured to communicate with the IRS controller via a DUI Interface.

6. The network device as claimed in claim 1, wherein the scheduling data request comprises a list of cell IDs of serving cells, list of the plurality of UEs, and no. of transmission time intervals (TTIs).

7. The network device as claimed in claim 1, wherein the scheduling data response comprises an amount of data to be scheduled, balance Packet Delay Budget (PDB) for data to be scheduled, an allocated Modulation and Coding Scheme (MCS), and a Received Channel Status Information (CSI).

8. The network device as claimed in claim 1, wherein the IRS resource command comprises a list of cell IDs, a list of UEs from the plurality of UEs, a list of IRS resources allocated for each cell and a corresponding validity time for allocation of IRS resources.

9. The network device as claimed in claim 1, wherein the IRS Manager is configured to, based on the received scheduling data response, derive a determined share of IRS resources for each cell being served.

10. The network device as claimed in claim 1, wherein the processor configures a MAC scheduler to start using allocated IRS resources for the plurality of UEs that are under coverage of the IRS.

11. A method for sharing Intelligent Reflecting Surface (IRS) resources of an Intelligent Reflecting Surface (IRS) in a communication network, the method comprising:
   receiving, by a network device, from an IRS manager, a scheduling data request, wherein the IRS manager transmits the scheduling data request upon determination of poor signal reception by a plurality of User Equipments (UEs) based at least in part on a measurement report received from the network device corresponding to each of the plurality of UEs;
   transmitting, by the network device, to the IRS manager, responsive to the received scheduling data request, a scheduling data response;
   receiving, by the network device, from the IRS manager, an IRS resource command, wherein the IRS manager transmits the IRS resource command responsive to the scheduling data response; and transmitting, by the network device, to an IRS controller associated with the IRS, the received IRS resource command, wherein IRS controller is configured to allocate the IRS resources to each of the plurality of UEs based on the IRS resource command.

12. The method as claimed in claim 11, wherein the measurement report comprises a Channel Quality Indicator (CQI) and Channel State Information (CSI) parameter of a serving cell, and Reference Signal Received Power (RSRP) information, and a Reference Signal Received Quality (RSRQ) parameter of a pilot signal as received from the IRS by each of the plurality of UEs.

13. The method as claimed in claim 11, wherein the network device is configured to communicate with the IRS manager via a Common Communications Interface Module (CCIM) Interface.

14. The method as claimed in claim 11, wherein the network device is configured to communicate with the IRS controller via a DUI Interface.

15. The method as claimed in claim 11, wherein the scheduling data request comprises a list of cell IDs of serving cells, list of the plurality of UEs, and no. of transmission time intervals (TTIs).

16. The method as claimed in claim 11, wherein the scheduling data response comprises an amount of data to be scheduled, balance Packet Delay Budget (PDB) for data to be scheduled, an allocated Modulation and Coding Scheme (MCS), and a Received Channel Status Information (CSI).

17. The method as claimed in claim 11, wherein the IRS resource command comprises a list of cell IDs, a list of UEs from the plurality of UEs, a list of IRS resources allocated for each cell and a corresponding validity time for allocation of IRS resources.

18. The method as claimed in claim 11 further comprising configuring, by the network device, a MAC scheduler to start using allocated IRS resources for the plurality of UEs that are under coverage of the IRS.

19. The method as claimed in claim 11, wherein the IRS Manager is configured to, based on the received scheduling data response, derive a determined share of IRS resources for each cell being served.

20. A non-transitory computer readable medium (CRM) comprising a set of instructions that when executed by a processor comprised in a network device, causes the processor to:
- receive, from an IRS manager, a scheduling data request, wherein the IRS manager transmits the scheduling data request upon determination of poor signal reception by a plurality of User Equipments (UEs) based at least in part on a measurement report received from the network device corresponding to each of the plurality of UEs;
- transmit, to the IRS manager, responsive to the received scheduling data request, a scheduling data response;
- receive, from the IRS manager, an IRS resource command, wherein the IRS manager transmits the IRS resource command responsive to the scheduling data response; and
- transmit, to an IRS controller associated with the IRS, the received IRS resource command, wherein IRS controller is configured to allocate the IRS resources to each of the plurality of UEs based on the IRS resource command.

* * * * *